US010712811B2

(12) United States Patent
Sun et al.

(10) Patent No.: US 10,712,811 B2
(45) Date of Patent: Jul. 14, 2020

(54) PROVIDING A DIGITAL MODEL OF A CORRESPONDING PRODUCT IN A CAMERA FEED

(71) Applicant: Facebook, Inc., Menlo Park, CA (US)

(72) Inventors: Yi Sun, Mountain View, CA (US); Jiajie Zhu, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 1 day.

(21) Appl. No.: 15/839,339

(22) Filed: Dec. 12, 2017

(65) Prior Publication Data

US 2019/0179405 A1 Jun. 13, 2019

(51) Int. Cl.
*G06F 3/01* (2006.01)
*G06F 3/0482* (2013.01)
*G06T 19/00* (2011.01)
*G06Q 30/06* (2012.01)
*G06F 1/16* (2006.01)
*G06F 3/03* (2006.01)

(52) U.S. Cl.
CPC ............ *G06F 3/011* (2013.01); *G06F 1/1686* (2013.01); *G06F 3/0304* (2013.01); *G06F 3/0482* (2013.01); *G06Q 30/0643* (2013.01); *G06T 19/006* (2013.01); *G06T 2210/16* (2013.01)

(58) Field of Classification Search
None
See application file for complete search history.

(56) References Cited

U.S. PATENT DOCUMENTS

2004/0049309 A1* 3/2004 Gardner ................... A41H 1/00
 700/132
2010/0030578 A1* 2/2010 Siddique ............ G06Q 10/0637
 705/3
2012/0306918 A1* 12/2012 Suzuki ............... G06F 3/04845
 345/633

(Continued)

FOREIGN PATENT DOCUMENTS

KR 10-2009-0026372 A 3/2009
WO WO 2019/117893 6/2019

OTHER PUBLICATIONS

Beautylish ("Get App-y: We Try Inglot's Virtual Makeover App", 2013, https://www.beautylish.com/a/vxyms/inglot-makeover-app) (Year: 2013).*

(Continued)

*Primary Examiner* — Xin Sheng
(74) *Attorney, Agent, or Firm* — Keller Jolley Preece

(57) ABSTRACT

One or more embodiments of the present disclosure provide an augmented reality presentation including a digital model of a product in connection with a camera stream. For example, systems and methods described herein provide a call-to-action associated with a digital model of a corresponding product. In response to detecting a selection of the call-to-action, systems and methods described herein provide the digital model. The system and methods described herein also activate a camera interface of a networking system application and render the digital model of the product within the camera interface. In this way, the systems and methods provide a portable user experience of trying on or otherwise sampling a product via an augmented reality presentation on a client device.

20 Claims, 14 Drawing Sheets

(56) References Cited

U.S. PATENT DOCUMENTS

| | | |
|---|---|---|
| 2013/0088490 A1 | 4/2013 | Rasmussen et al. |
| 2015/0055085 A1 | 2/2015 | Fonte et al. |
| 2016/0035133 A1 | 2/2016 | Ye et al. |
| 2017/0018024 A1 | 1/2017 | Xu et al. |
| 2017/0236197 A1* | 8/2017 | Acken ................ G06Q 30/0643 705/26.81 |
| 2017/0270709 A1 | 9/2017 | Tran et al. |
| 2017/0293958 A1 | 10/2017 | Tang |

OTHER PUBLICATIONS

FaceCake ("New Technology Lets You Try on Virtual Clothes Before You Buy", 2013, https://www.youtube.com/watch?v=_1GyAO5lFpE) (Year: 2013).*

MultiVu ("Sephora Virtual Artist App", 2016, https://www.youtube.com/watch?v=NFApcSocFDM) (Year: 2016).*

Messenger ("Try on lip shades with Sephora", 2016, https://twitter.com/messenger/status/755418433047568384) (Year: 2016).*

Extended European Search Report as received in European application 18 180 867.6 dated Oct. 1, 2018.

International Search Report & Written Opinion as received in PCT/US2017/066118 dated Sep. 12, 2018.

FaceCake ("New Technology Lets You Try on Virtual Clothes Before You Buy", 2013, https://www.youtube.conn/watch?v=1GyA051FpE) (Year: 2013).

U.S. Appl. No. 15/839,339, Feb. 21, 2019, Office Action.

U.S. Appl. No. 15/839,339, Aug. 21, 2019, Office Action.

* cited by examiner

PROVIDING A DIGITAL MODEL OF A CORRESPONDING PRODUCT IN A CAMERA FEED

BACKGROUND

Multi-media communication provides an increasingly popular method to connect via communication systems. For example, where communication systems once limited users to communicate via written electronic communications, users can now communicate electronically via digital media including images or videos captured from a personal computing device, such as a smart phone. Indeed, communication systems now enable users to broadcast video streams to communicate with co-users. Because of the increasing popularity of online communication, as well as the increasing amount of digital media shared via users of various communication systems, communication systems provide an ideal forum for merchants, marketers, and other entities to increase awareness and boost sales for products and services. Increasing product awareness using conventional communication systems, however, have a number of drawbacks and limitations.

For example, conventional systems for raising awareness through digital media often fail to provide a realistic representation of goods or services portrayed within the digital media. For instance, in promoting an article of clothing, merchants and marketers often professionally produce an image or video in which the clothing is portrayed by a model in a controlled environment (e.g., a professional photoshoot). While professionally producing images and videos can effectively raise positive awareness about a product, many consumers hesitate to purchase clothing, accessories, or other products without seeing how the product would appear on themselves under normal or more realistic circumstances.

Some merchants and marketers provide virtual kiosks that enable users to have a virtual experience of virtually trying on clothing within a virtual environment. Virtual kiosks, however, typically require a user to travel in-person to a store or other physical location of the kiosk in order to have an experience of trying on a limited selection of clothing stored by the merchant on the kiosk. Moreover, virtual kiosks include bulky, expensive, and specialized equipment that substantially limit the virtual experience to a select number of merchants and consumers. As a result, providing virtual kiosks involves substantial costs to merchants as well as an inconvenient and time-consuming experience for consumers. Conventional system cause these and other problems.

BRIEF SUMMARY

One or more embodiments of the present disclosure provide benefits and/or solve one or more of the foregoing problems in the art with systems, methods, and computer-readable media that provide a portable and convenient user experience that enables a user to try on, view, or otherwise sample a product via an augmented reality experience provided by a client device (e.g., a mobile device). In particular, as will be described in further detail below, systems, methods, and computer readable media render a digital model of the product within a camera feed of a client device to provide an augmented reality experience that enables a user to try on, or sample, a product. As will be described in further detail below, the systems, methods, and computer readable media include features that facilitate a portable and convenient user experience that provides a realistic representation of the product in a context applicable to the user.

As will be described in further detail below, the systems, methods, and computer readable media described herein involve identifying and providing an augmented reality experience by combing a digital model of a product and a camera stream. For example, as will be described in further detail below, the systems, methods, and computer readable media involve detecting a user selection of a call-to-action provided in connection with a product. In response to detecting the user selection of the call-to-action, the systems, methods, and computer readable media facilitate activation of a camera interface on the client device. In addition to activating the camera of the client device, the systems, methods, and computer readable media provide an augmented reality experience by rendering the digital model of the product on a person live camera stream.

Additional features and advantages of one or more embodiments of the present disclosure will be set forth in the description that follows, and in part will be obvious from the description, or may be learned by the practice of such example embodiments.

BRIEF DESCRIPTION OF THE DRAWINGS

The detailed description is described with reference to the accompanying drawings in which.

DETAILED DESCRIPTION

Figure 1:
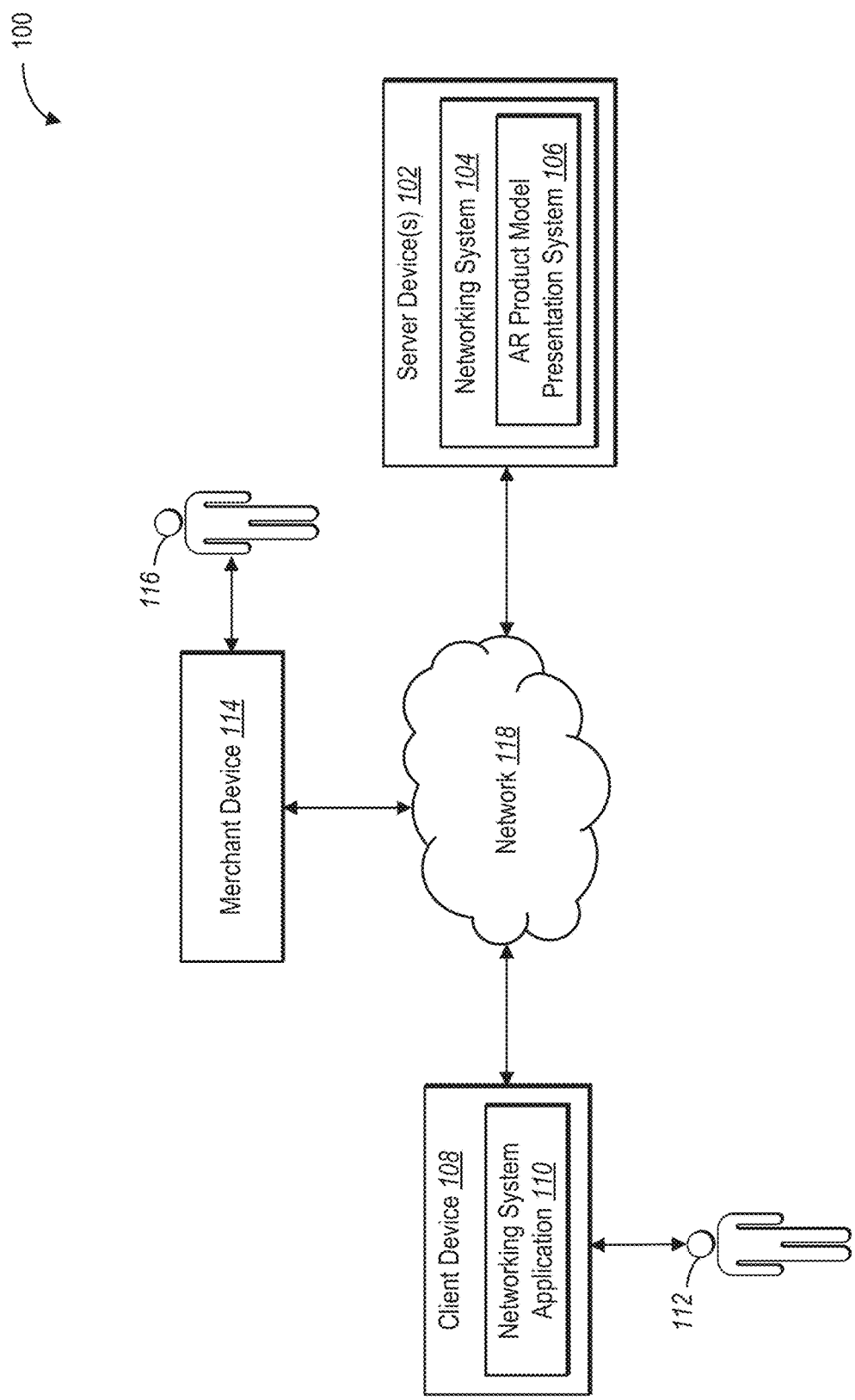
FIG. 1 illustrates a block diagram of an environment in which an AR product model presentation system is implemented in accordance with one or more embodiments.

One or more embodiments of the present disclosure include an AR product model presentation system that provides an augmented reality presentation or experience including a digital model of a product within or otherwise in connection with a camera stream captured by a client device. In particular, as will be described in further detail below, the AR product model presentation system provides an augmented reality experience in which a client device captures and displays a camera stream via a graphical user interface of the client device. In addition, the AR product model presentation system identifies a digital model of the product and renders the digital model of the product on a person within the camera stream.

In one or more embodiments, the AR product model presentation system generates the digital model of the product. For example, the AR product model presentation system receives, generates, or otherwise obtains a digital model of the product and instructions for rendering the digital model of the product within a camera stream. As will be described in further detail below, the AR product model presentation system can generate the digital model of the product on a server device or, alternatively, receive the digital model of the product from another device (e.g., client device, merchant device).

Where a digital model has been created for a corresponding product, the AR product model presentation system can provide a call-to-action (such as a selectable product link) in connection with digital media associated with the product. As an example, where a merchant, marketer, or other entity provides an advertisement including digital media (e.g., an image or a video) that portrays the product, the AR product model presentation system can facilitate providing a product link in connection with the digital media that includes instructions for obtaining the digital model of the product and providing an augmented reality presentation providing the digital model of the product in connection with a person captured within a camera stream. In one or more embodiments, the AR product model presentation system provides the call-to-action in connection with the digital media. Alternatively, in one or more embodiments, the AR product model presentation system provides data that enables a merchant, marketer, or other entity to provide the call-to-action in connection with the digital media.

As will be described in further detail below, the AR product model presentation system can detect a selection of the call-to-action and trigger presentation of a digital model of a product in connection with a person within a camera stream. In particular, in one or more embodiments, the AR product model presentation system provides a digital model of the product in response to detecting a selection of the call-to-action. In addition, the AR product model presentation system can activate a camera interface of a networking system application on a client device in response to detecting the selection of the call-to-action. Upon activation of the camera interface, the client device captures and provides a camera stream within the camera interface. The AR product model presentation system can further render the digital model of the product within the camera stream on a person.

Moreover, in one or more embodiments, the AR product model presentation system enables a user to try on different products by providing multiple digital models corresponding to a variety of products. For example, in response to detecting a selection of a call-to-action, the AR product model presentation system can identify and provide multiple digital models associated with different products within a camera stream.

The AR product model presentation system provides a portable user experience by enabling a user to try on, or otherwise view, how various products appear contextually via a graphical user interface of a client device. Indeed, upon receiving the digital model of a product, the AR product model presentation system leverages image capturing capabilities of existing hardware on the client device to capture a camera stream. In addition, the AR product model presentation system utilizes the networking system application on the client device to provide an AR presentation that includes the digital model of the product over a portion of a camera stream captured by the client device.

The AR product model presentation system further enables a merchant, marketer, or other entity to implement the augmented reality presentation from a variety of platforms, as described below. For example, by providing a selectable call-to-action that includes instructions for obtaining the digital model of the product and activating the camera interface, the AR product model presentation system can trigger presenting the augmented reality presentation from different platforms.

Furthermore, the AR product model presentation system provides greater accessibility to any number of digital models for products from any number of providers (e.g., merchants, brands, etc.) without requiring that the client device generate, store, or otherwise maintain an excessive number of digital models on the client device. Indeed, by providing the call-to-action with instructions for obtaining a digital model of a product, the AR product model presentation system provides access to any number of digital models without utilizing large amounts of storage space on the client device. As will be described in further detail below, the AR product model presentation system includes additional features and functionality that facilitate selectively retrieving digital models for various products without over-utilizing local storage space of the client device.

As used herein, a "digital model" refers to data that facilitates presentation of a digital representation of an object within a graphical user interface. In one or more embodiments, a digital model of an object includes a three-dimensional digital representation of the object. In one or more embodiments, the digital model refers to a digital model of a product associated with a brand, merchant, or other entity. In addition to the digital representation of the object itself, a digital model includes interaction data that determines placement and behavior of the digital representation of the object in connection other content shown within a graphical user interface. For instance, a digital model of a product can include instructions for placing or otherwise positioning the digital model product over detected content shown within a camera stream interface. As an illustrative example, where a digital model corresponds to a pair of glasses, the digital model of the pair of glasses may include a three-dimensional representation of the pair of glasses and instructions for positioning the glasses over specific features of a face (e.g., eyes, forehead, ears) shown within a camera stream. In addition, as content of the camera stream moves, the digital model of the pair of glasses can move based on updated positioning of detected features within the camera stream.

As used herein, a "product" refers to an object provided by a merchant, business, individual, or other entity. In one or more embodiments, a product refers to an object that may be worn by a user. By way of example and not by way of limitation, a product may refer to an article of clothing, hats, jewelry, glasses, make-up, wearable devices like smart watches, or other wearable objects. Alternatively, while one or more embodiments described herein refer specifically to clothing and other objects that a user "tries on," a product may nevertheless refer to other types of objects sold by a merchant, business, individual, or other entity that are not wearable.

As mentioned above, the AR product model presentation system can provide a digital model of a product within a graphical user interface in connection with a camera stream. As used herein, a "camera stream" refers to a captured video, time lapse, image, series of multiple images, or other digital content captured using image capturing hardware (e.g., a camera) of a client device. In one or more embodiments, a camera stream refers to captured content displayed via a graphical user interface of a client device. In one or more embodiments described herein, the AR product model presentation system provides an augmented reality presentation including a camera stream in connection with a digital model of the product displayed within a graphical user interface of a client device. In one or more implementations, a camera stream is a real-time feed from a camera.

As further mentioned above, in one or more embodiments, the AR product model presentation system provides the augmented reality presentation based on a detected user selection of a call-to-action. As used herein, a "call-to-action" refers to a selectable graphical user face item that when selected causes a client device to perform one or more actions. Such actions can comprise activating a camera, opening an application, requesting or downloading a digital model of a product for use in an augmented reality experience. By way example, but not limitation, in one or more embodiments a call-to-action comprises a selectable link in a graphical user interface, a QR or other code that can be scanned by a camera, an activatable graphical user interface element, etc.

In one or more embodiments, the call-to-action is a trigger that causes a device to automatically (i.e., without further user input beyond selecting the call-to-action) perform one or more actions. For example, a call-to-action can include instructions (e.g., embedded instructions such as JAVA script) for obtaining a digital model of a corresponding product and activating a camera interface of a networking system application to display a camera stream. In one or more embodiments, the call-to-action is a deep link to a camera interface of a networking system application that triggers activating a camera and providing the augmented reality presentation within the camera interface.

Additional detail will now be provided regarding the AR product model presentation system in relation to illustrative figures portraying exemplary embodiments. For example, FIG. 1 illustrates a block diagram of an example communication environment 100 for providing an augmented reality presentation including a digital model of a product within, or otherwise in connection with, a camera stream captured by a client device. As illustrated in FIG. 1, the communication environment 100 includes a server device(s) 102 including a networking system 104 and AR product model presentation system 106. The communication environment 100 further includes a client device 108 having a networking system application 110 that a user 112 can access. The communication environment further includes a merchant device 114 that a user 116 (e.g., merchant, administrative user) can access. In one or more embodiments, the networking system applications 110 on the client device 108 includes an AR product model presentation system that provides similar features and functionality as the AR product model presentation system 106 on the server device(s) 102. Nonetheless, for the sake of explanation, one or more embodiments described herein relate specifically to an AR product model presentation system 106 implemented on the server device(s) 102.

As shown in FIG. 1, each of the server device(s) 102, client device 108, and merchant device 114 can communicate over a network 118. The network 118 may include one or multiple networks and may use one or more communication platforms or technologies suitable for transmitting data. In one or more embodiments, the network 118 includes the Internet or World Wide Web. In addition, or as an alternative, the network 118 can include various other types of networks that use various communication technologies and protocols. Additional details relating to the network 118 are explained below.

Although FIG. 1 illustrates a number and arrangement of the server device(s) 102, client device 108, and merchant device 114, it will be understood that the communication environment 100 can include any number of devices, including any number of server devices, client devices, and merchant devices. Moreover, one or more of the devices may directly communicate with the server device(s) 102 or via an alternative communication network, bypassing the network 118.

In addition, the client device 108 or merchant device 114 may refer to various types of computing devices. For example, one or more of the devices may include a mobile device such as a mobile telephone, a smartphone, a PDA, a tablet, or a laptop. Additionally, or alternatively, one or more of the devices may include a non-mobile device such as a desktop computer, a server, or another type of computing device. Additional detail with regard to different types of computing devices is described in reference to FIG. 12.

The networking system 104 can refer to various types of networking systems including, for example, a social networking system, an electronic messaging system, or other type of networking system over which a community of users and co-users can share and access digital content. As such, while one or more examples described herein refer specifically to a social networking system, it will be understood that features and functionality described in connection with a social networking system can similarly apply to other types of networking systems. Additional detail with regard to the networking system 104, and particularly an example social networking system, is described below in connection with FIGS. 13-14.

In one or more embodiments, the networking system application 110 (e.g., a social networking system application and/or electronic messaging application) refers to one, or a collection of, software application(s) associated with the networking system 104. In one or more embodiments, the networking system application 110 provides and controls various features and functionality on the client device 108 to enable the user 112 to interact with other users of the networking system 104, including by sharing digital content with other users of the networking system 104. In one or more embodiments, the networking system application 110 refers to a native or hybrid application installed on a respective computing device. Alternatively, in one or more embodiments, the networking system application 110 refers to a web browser used to access the networking system 104 (e.g., a website associated with the networking system 104 provided via a web browser on a respective computing device). While FIG. 1 shows an example in which the client device 108 includes the networking system application 110, in one or more embodiments, the merchant device 114 similarly includes a networking system application 110.

In one or more embodiments, client device 108 refers to a client device from where a camera stream (e.g., a live video stream) originates. Alternatively, the client device 108 can refer to a client device that presents a view of a camera stream received from a broadcasting client device and received via the networking system 104. Accordingly, in one or more embodiments, the user 112 can broadcast a presentation including a camera stream to other users of the networking system 104, as well as, view one or more camera streams shared by other users of the networking system 104.

In one or more embodiments, the AR product model presentation system 106 facilitates generation of digital models of corresponding products. For example, in one or more embodiments, the AR product model presentation system 106 compiles a collection or catalog of digital models corresponding to a plurality of products. In one or more embodiments, the AR product model presentation system 106 provides functionality via the networking system 104 (e.g., via a networking system application on the merchant device 114) to create and store digital models on the server device(s). For example, the AR product model presentation system 106 may provide an application via a web browser or dedicated application that enables the merchant device 114 to create and store digital models on a storage space of the server device(s) 102.

In addition, or as an alternative, to generating the digital models on the server device(s) 102, the AR product model presentation system 106 can receive the digital models from one or more merchant devices and store the digital models on a storage space of the server device(s) 102. In one or more embodiments, the AR product model presentation system 106 receives digital models corresponding to one or more products associated with a given merchant from the merchant device 114. Alternatively, in one or more embodiments, the merchant device 114 locally creates and stores digital models for corresponding provides and provides them upon request from the server device(s) 102 (e.g., in response to receiving a request from a client device 108).

As mentioned above, the AR product model presentation system 106 can provide a call-to-action associated with a respective digital model. For example, in one or more embodiments, the AR product model presentation system 106 generates a product link including instructions associated with obtaining a digital model as well as triggering activation of a camera interface of the networking application system 110. The instructions can further cause the client device to capture a camera stream using image capturing hardware (e.g., a front or back camera) of the client device 108. In one or more embodiments, the product link includes a plug-in provided in connection with digital media (e.g., an image, a video) associated with a product. For instance, in one or more embodiments, the product link refers to a selectable link or plug-in provided in association with an advertisement for the product.

As will be described in further detail below, the AR product model presentation system 106 can provide the call-to-action via a variety of platforms. For example, in one or more embodiments, the merchant device 116 provides the call-to-action via a website associated with the merchant. In one or more embodiments, the merchant device 116 provides the call-to-action by receiving data for creation of the product link from the AR product model presentation system 106 and embeds the product link including associated data in connection with digital media for the product (e.g., over a portion of a product image). In still further embodiments, the call-to-action comprises a QR or other code on a webpage, digital or physical advertisement, or on the product itself.

As an alternative to providing the call-to-action via a third-party website, the AR product model presentation system 106 can provide the call-to-action via a platform associated with the networking system 104. For example, the AR product model presentation system 106 can provide the call-to-action in connection with digital media displayed via a newsfeed, user profile, group profile, or other page hosted or otherwise provided by the networking system 104

As another example, the AR product model presentation system 106 can provide the call-to-action via an augmented reality presentation including a camera stream (e.g., a live video feed) and a digital model of a product. For example, in one or more embodiments, the AR product model presentation system 106 provides a selectable product link within a graphical user interface of a live video feed originating from the client device 108. Alternatively, in one or more embodiments, the AR product model presentation system 106 provides a selectable product link within a graphical user interface of a client device 108 for a video stream received from a different client device.

Regardless of the specific platform over which the call-to-action is provided, the call-to-action can include similar instructions for providing the augmented reality presentation including the digital model of the product in connection with a camera stream. In particular, in one or more embodiments, the call-to-action includes a deep link to a networking system application 110 that causes the client device to open the networking application 110 and provide the camera stream within the camera interface of the networking application 110. Accordingly, even where the call-to-action is provided via a third-party website or other platform independent from the networking system 104 or networking system application 110, the call-to-action can nonetheless trigger activation of the camera interface of the networking system application 110.

The AR product model presentation system 106 can further detect a user selection/activation of the call-to-action. For example, in one or more embodiments, the client device 108 or the networking system application 110 detects a selection of the product link. In other embodiments, the client device 108 or the networking system application 110 detects selection of a graphic user interface element. In still further embodiments, the client device 108 or the networking system application 110 detects the scanning of a QR code. In response to the selection/activation of the call-to-action, the networking system application 110 provides an indication to the AR product model presentation system 106. In response, the AR product model presentation system 106 can identify a digital model associated with the call-to-action and provide the digital model to the client device 108. In one or more embodiments, the AR product model presentation system 106 retrieves the digital model from a storage space of the server device(s) 102. Alternatively, in one or more embodiments, the AR product model presentation system 106 requests a digital model from the merchant device 114 (or other remote device), which provides the digital model of the product to the client device 108 directly, or by way of the server device(s) 102.

Upon receiving the digital model, the networking system application 110 can render the digital model of the product within a camera interface of the networking system application 110. In particular, in response to detecting the user selection of the call-to-action, the networking system application 110 can activate a camera and provide a display of a camera stream captured by the client device. In addition, the networking system application 110 can render the digital model of the product in connection with the camera stream to generate an augmented reality presentation including both the camera stream and the digital model of the product. For example, in one or more embodiments, the networking system application 110 renders the digital model of the product over the camera stream (e.g., superimposed over a portion of the camera stream, such as a person) within a camera interface of the networking system application 110.

More particularly, in real-time, the networking system application 110 can analyze the camera feed to identify a face or other determined object or set of objects. The networking system application 110 can then track the position of the identified object(s) in real-time. The networking system application 110 can then identify metadata or rendering instructions associated with the digital model that indicates how to position the digital model relative to the identified and tracked object(s). The networking system application 110 can then render the digital model on the camera stream in accordance with the rendering instructions.

Additional detail will now be given with respect to providing an augmented reality presentation via a graphical user interface of a client device. For example, FIGS. 2A-5 illustrate a mobile device 202 having a graphical user interface 204 for providing an augmented reality presentation including a digital model of a product in accordance with one or more embodiments. As further shown, the mobile device 202 includes a front camera 205 positioned on a front surface of the mobile device 202. FIGS. 2A-5 illustrate example embodiments in which a call-to-action is provided via different platforms and which cause a networking system application 110 of the mobile device 202 to provide a camera stream in connection with a digital model of a product. It will be understood that while the graphical user interfaces shown by FIGS. 2A-5 illustrate different features and functionality of the AR product model presentation system 106 by way of example and not limitation. Accordingly, one or more features and functionalities of the AR product model presentation system 106 described in connection with the individual graphical user interfaces of FIGS. 2A-5 can similarly apply to any of the graphical user interfaces of FIGS. 2A-5.

Figure 2B:
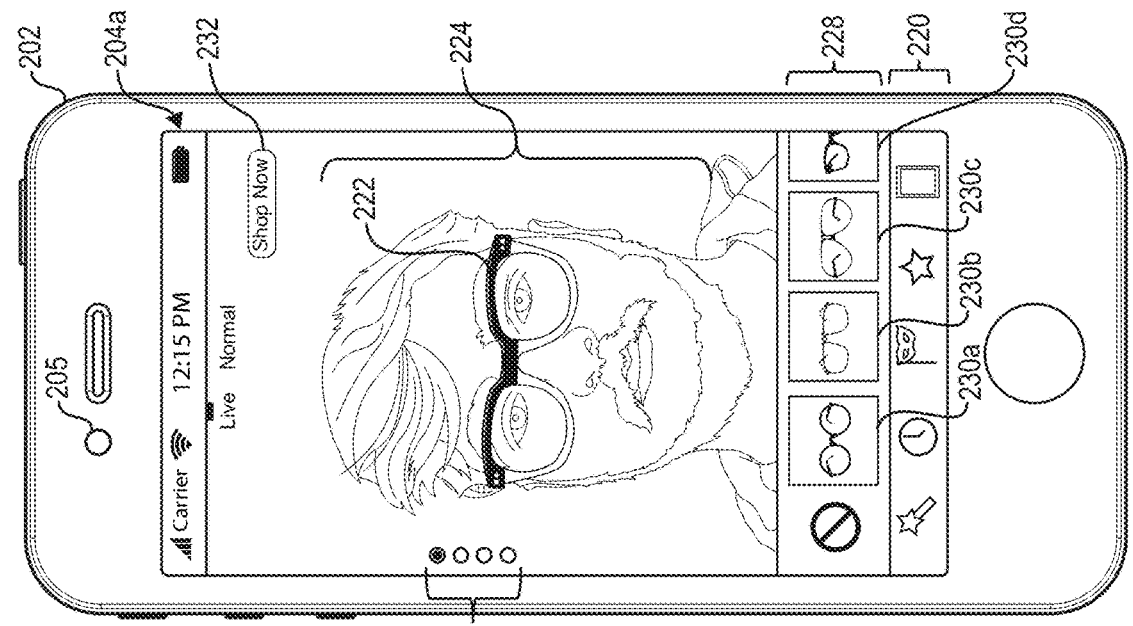
FIGS. 2A-2B illustrate example graphical user interfaces illustrating an augmented reality presentation in accordance with one or more embodiments.
Figure 2A:
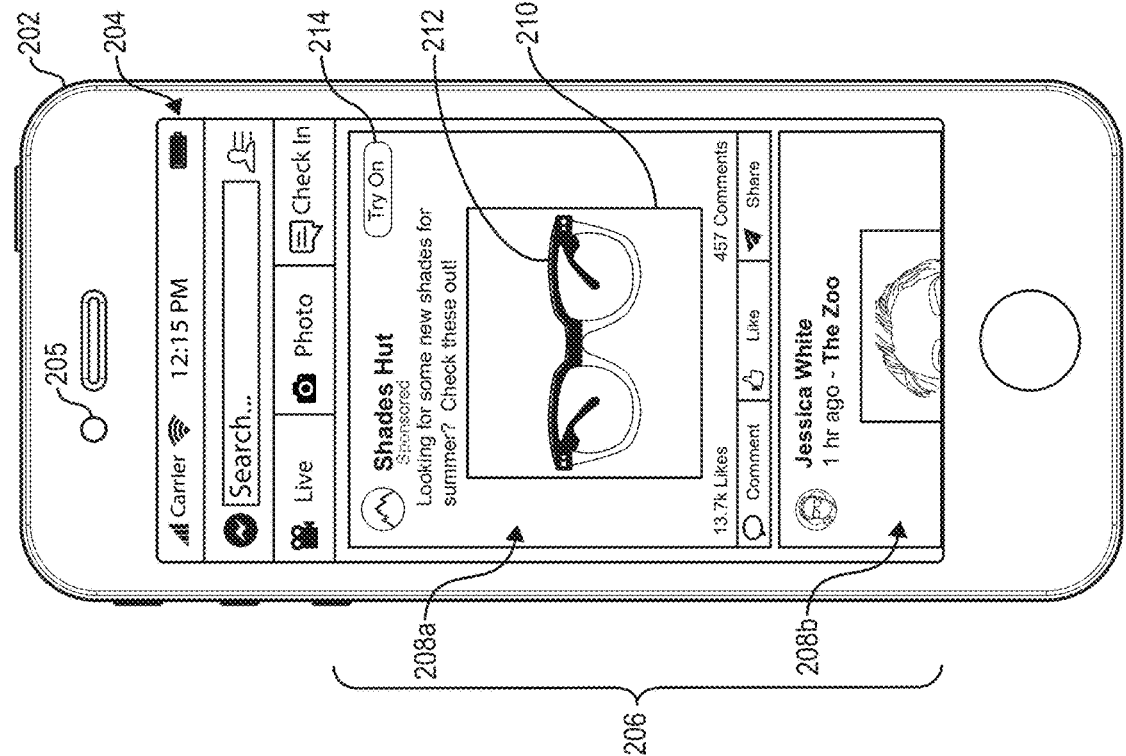

FIG. 2A illustrates an example graphical user interface 204 including a feed of digital media 206 that shows content provided by the networking system 104 to a user of the mobile device 202. In particular, as shown in FIG. 2A, the feed 206 includes a plurality of posts 208a-b shared by different users of the networking system 104. In one or more embodiments, the feed 206 includes posts including shared photos, videos, messages, advertisements, and other content shared to the user of the mobile device 202 via a user account (e.g., user profile, personalized newsfeed, digital forum, etc.) of the networking application 104. In one or more embodiments, the feed 206 is provided via a graphical user interface of the networking system application 110 on the mobile device.

As shown in FIG. 2A, a first post 208a within the feed 206 includes a product image 210 including a photo of a pair of glasses 212. In one or more embodiments, the networking system 104 provides the post 208a based on a request to share the post 208a with users of the networking system 104 including a user (e.g., via a user account) of the mobile device 202. For example, a merchant, marketer, or other entity having an account with the networking system 104 can request to share a sponsored post promoting a product (e.g., via an advertisement bidding process or other method). In response, the networking system 104 provides the first post 208a including the product image 210 provided by the merchant, marketer, or other entity and including a promotion for the pair of glasses 212 shown within the product image 210. As an alternative to sharing the product image 210, in one or more embodiments, the networking system 104 enables a merchant, marketer, or other entity to share videos, comments, or other digital media associated with corresponding product(s).

As further shown in FIG. 2A, the first post 208a includes a try on icon 214 (i.e., a call-to-action). In one or more embodiments, the AR product model presentation system 106 provides the try on icon 214 in connection with the post 208a and/or product image 210. For example, in one or more embodiments, the AR product model presentation system 106 provides the try on icon 214 in a header of the post 208a (as shown in FIG. 2A). Alternatively, in one or more embodiments, the AR product model presentation system 106 provides the try on icon 214 over a portion of the product image 210.

In one or more embodiments, the try on icon 214 comprises a selectable product link associated with the product (e.g., the pair of glasses 212) shown within the post 208a. For example, in one or more embodiments, the try on icon 214 includes a link associated with a digital model of the individual product shown within the post 208a. Alternatively, in one or more embodiments, the try on icon 214 includes a link associated with multiple digital models for respective corresponding products. For example, in one or more embodiments, selecting the try on icon 214 prompts the AR product model presentation system 106 to provide digital models for an associated product and one or more related products. For instance, the try on icon 214 may include instructions for obtaining a digital model of the pair of glasses 212 as well as digital models for other pairs of glasses from the same brand or merchant as the pair of glasses 212 shown in the product image 210.

In one or more embodiments, the AR product model presentation system 106 provides the try on icon 214 based on a determination that a digital model exists for the corresponding product. For example, in one or more embodiments, the AR product model presentation system 106 determines that a storage space on, or otherwise associated with, the server device(s) 102 includes a digital model of the pair of glasses 212 shown within the post 208a. Alternatively, the AR product model presentation system 106 may receive an indication from the merchant, marketer, or other entity sharing the post 208a that a digital model of the product exists and can be provided upon request. In contrast, where the AR product model presentation system 106 cannot identify a digital model of the product shown within a post or image, the AR product model presentation system 106 can exclude the try on icon 214 from the post 208a.

In one or more embodiments, rather than providing the try on icon 214, as shown in FIG. 2A, the AR product model presentation system 106 can cause the product image 210, pair of glasses 212, or the post 208a itself to function as a selectable call-to-action. As an example, in one or more embodiments, the AR product model presentation system 106 enables a user of the mobile device 202 to select the product image 210 itself and trigger presentation of a camera interface and provide the digital model of the pair of glasses 212. Accordingly, in one or more embodiments, the post 208a, product image 210, or specific portion of the product image 210 (e.g., the portion corresponding to the pair of glasses) comprises a call-to-action that enables a user of the mobile device 202 to receive a digital model of the product.

In response to detecting a user selection/activation of the call-to-action (e.g., the try on icon 214), the AR product model presentation system 106 can trigger a series of actions. For example, in response to detecting a selection of the try on icon 214, the AR product model presentation system 106 provides a digital model of the pair of glasses 212 to the client device. In addition, the networking system application 110 can activate a camera interface and provide a camera stream captured by a camera of the mobile device 202 in response to detecting the user selection of the call-to-action. Further, the networking system application 110 can render the digital model of the pair of glasses within the camera interface via the graphical user interface 204 of the mobile device 202. For example, the networking system application 110 can render the digital model of the pair of glasses based on the data contained within the digital model.

To illustrate, in response to detecting a selection of the try on icon 214, the networking system application 110 can provide the graphical user interface 204a shown in FIG. 2B. As shown in FIG. 2B, the networking system application 110 provides a camera interface 216 within the graphical user interface 204a including a camera stream 218 (e.g., a live video stream) captured by the front camera 205 (or another camera) of the mobile device 202. As further shown, the camera interface 216 includes camera controls 220 that enable a user of the mobile device 202 to select various enhancements to the camera stream 218. For example, the camera controls 220 can include frames, masks, backgrounds, and other types of enhancements or effects that the networking system application 110 can add within the camera interface 216 to supplement content shown within the camera stream 218.

As mentioned above, the networking system application 110 can provide digital model of the selected product in connection with detected content within the camera stream 218. For example, as shown in FIG. 2B, the camera interface 216 includes a digital model of the glasses 222 positioned over a detected face 224 shown within the camera stream 218. In one or more embodiments, the networking system application 110 identifies the detected face 224 including various features of the face 224 (nose, eyes, ears, forehead, etc.) and positions the digital model of the glasses 222 based on the detected face 224 and associated features. Accordingly, as shown in FIG. 2B, the networking system application 110 positions the digital model of the glasses 222 over the eyes, as they would normally appear if worn by an individual.

While one or more examples described herein relate specifically to positioning a digital model of a product over a face, the AR product model presentation system 106 can similarly place the digital model over other types of detectable content. For example, the AR product model presentation system 106 can detect a hand within the camera stream and render a digital model of a bracelet, ring, or glove over the hand. As another example, the AR product model presentation system 106 can detect a door, window, or other object having detectable features and render a digital model of a wreath, curtains, or other object over the respective object(s). Accordingly, while one or more embodiments described herein relate specifically to rendering an object over a portion of a face shown within a camera stream, the AR product model presentation system 106 can nonetheless render digital models for a variety of products over a variety of detectable objects.

In one or more embodiments, the networking system application 110 provides various selectable options to modify the digital model of the glasses 222. For example, in one or more embodiments, the networking system application 110 provides color options 226 (or other visual options) that enable a user to toggle between different colors. For example, a user can swipe a finger up or down across the camera interface 216 and cause the digital model of the glasses 222 to change colors. In addition, or as an alternative, in one or more embodiments, the camera interface 216 includes options to change the size, transparency, or other appearance of the digital model of the glasses 222 shown within the camera interface 216.

As further shown, the networking system application 110 can provide a menu of product options 228 including different models 230a-d of glasses. For example, in one or more embodiments, the AR product model presentation system 106 obtains (e.g., in response to detecting the user selection of the try on icon 214) multiple digital models corresponding to different pairs of glasses from the same merchant or brand and provides an option to view digital models of the different models within the camera interface 216. For example, in response to detecting a user selection of the try on icon 214, the AR product model presentation system 106 can provide any number of digital models to the mobile device 202. In this way, a merchant or brand can enable a user of the mobile device to "try on" more than one specific model of a product. In one or more embodiments, the AR product model presentation system 106 replaces the digital model of the glasses 222 with new digital model based on detecting a selection of one of the alternative models 230a-d of glasses within the menu of product options 228.

In addition to generally enabling a user of the mobile device 202 to view digital models of different products, the AR product model presentation system 106 further enables a user to shop for the product(s) shown within the camera interface 216. For example, as shown in FIG. 2B, the camera interface 216 includes a shop now icon 232 that enables the user of the mobile device 202 to purchase the pair of glasses 212 shown by the digital model of the glasses 222 provided in connection with the camera stream 218. For example, the shop now icon 232 can comprise a call-to-action that causes the mobile device to navigate to a third-party website associated with the merchant. For instance, in one or more embodiments, in response to detecting a selection of the shop now icon 232, the AR product model presentation system 106 routes the user to a third-party website where a user can enter payment information and purchase the product. Alternatively, in one or more embodiments, the AR product model presentation system 106 provides a payment interface within a graphical user interface of the networking system application 110 and enables the user to purchase the product via the networking system 104 (e.g., using payment information accessible to the networking system 104).

Figure 3B:
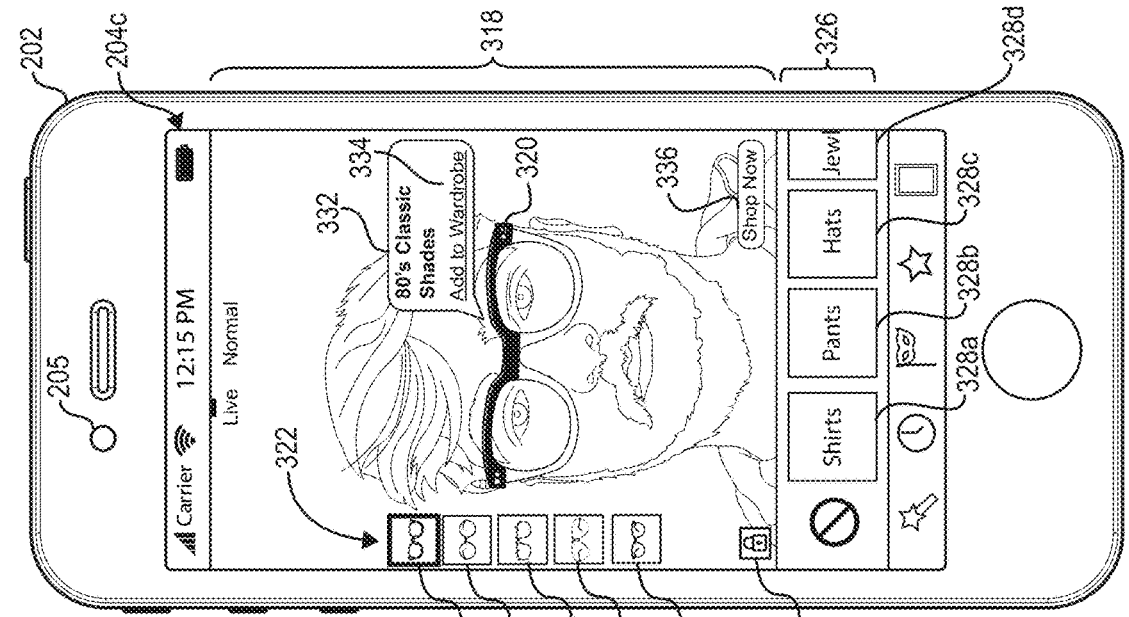
FIGS. 3A-3B illustrate example graphical user interfaces illustrating another augmented reality presentation in accordance with one or more embodiments.
Figure 3A:
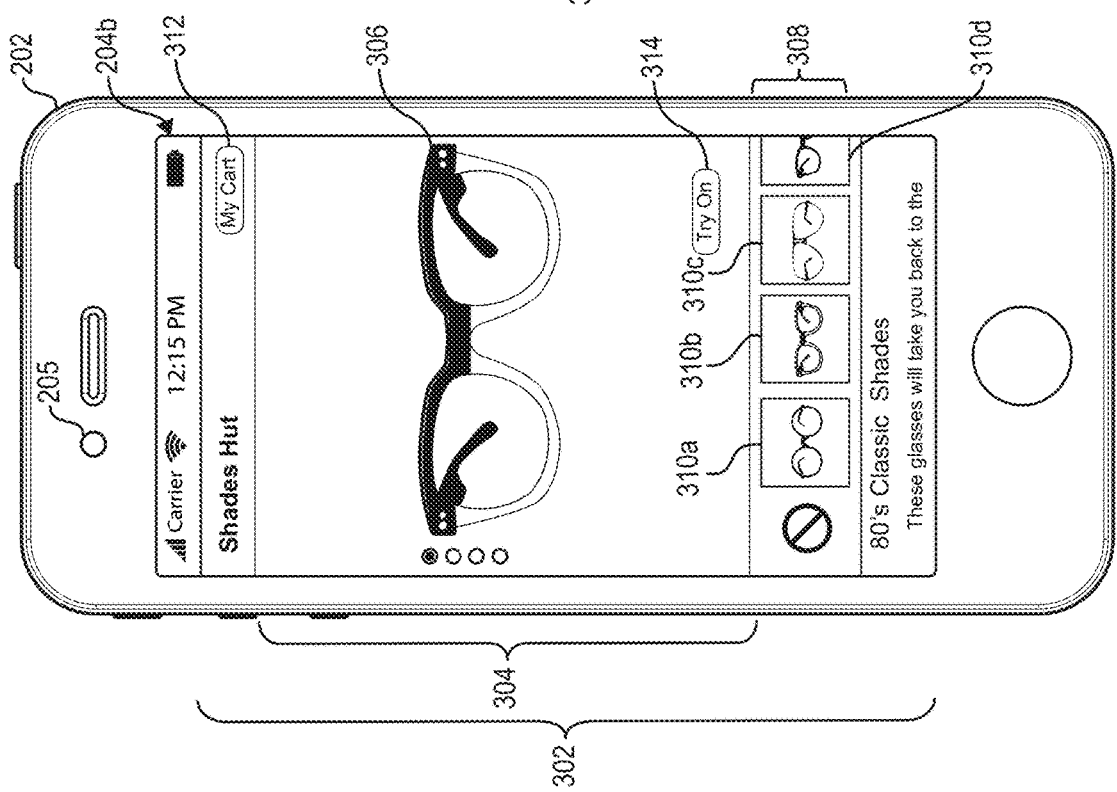

While FIGS. 2A-2B illustrate an example in which a user may "try on" a pair of glasses shown within a post on a social networking system, FIGS. 3A-3B illustrate another example in which a user may "try on" a pair of glasses shown on a website (e.g., a third-party website of the merchant or a page of the merchant with the networking system) or a native application associated with a merchant or brand of the glasses. For example, FIG. 3A illustrates the mobile device 202 described above in connection with FIGS. 2A-2B. As shown in FIG. 3A, the graphical user interface 204b includes a website/client application display 302 including digital media provided in connection with products. For example, the display 302 shows a product image 304 including a pair of glasses 306 sold by a merchant associated with the website/client application. As further shown, the display includes a menu of related products 308 including different models 310a-d for different types and styles of glasses sold by the merchant. The display further includes a my cart icon 312 that enables a user to manage a shopping cart via the website/client application including any number of products shown on the website.

In one or more embodiments, the AR product model presentation system 106 provides access to digital models for one or more products shown on the website. For example, a merchant may store (e.g., on a third-party server or on a storage space of the networking system 104) a digital model of one or more of the products shown on the website. For instance, a merchant associated with the website can create a digital model of the pair of glasses 306 shown in the product image as well as individual digital models for each of the models 310a-d shown in the menu of related products 308.

As shown in FIG. 3A, the website display 302 includes a try on icon 314 positioned over a portion of the product image 304 including similar features and functionality as the try on icon 214 discussed above in connection with FIG. 2A. In particular, the try on icon 314 includes a call-to-action including instructions that enable the networking system application 110 to retrieve the digital model of the associated product and provide an AR experience including the digital model.

In one or more embodiments, the AR product model presentation system 106 provides the try on icon 314 based on detecting that an object shown or illustrated within the display 302 corresponds to a digital model stored on the server device(s) 102. For example, in one or more embodiments, the AR product model presentation system 106 detects an object corresponding to a digital model for a product and provides the try on icon 314 including a selectable link for receiving the digital model and providing a digital model of the product within a camera interface of the networking system application (e.g., via a plug-in independent from the website). In one or more embodiments, the networking system application 110 locally detects the object shown within the website display 302 and provides the try on icon 314 on the mobile device 202, as shown in FIG. 3A.

Similar to the example graphical user interface 204a described above in connection with FIG. 2B, in response to detecting a user selection of the try on icon 314, a networking system application 110 on the mobile device 202 provides the graphical user interface 204c shown in FIG. 3B. As shown in FIG. 3B, the networking system application 110 provides a camera interface 316 including a camera stream 318 captured by the front camera 205 (or another camera) of the mobile device 202. As further shown, the camera interface 316 includes a digital model of the glasses 320 corresponding to the pair of glasses 306 shown in FIG. 3A. As illustrated in FIG. 3B, and similar to one or more embodiments described herein, the networking system application 110 positions the digital model 320 of the glasses 306 over detected features of an identified face or profile shown within the camera stream 318. Furthermore, the networking system application 110 can track the features of the face and update the position of the digital model 320 of the glasses 306 in real time so they stay in the proper position as the captured face moves in the camera stream.

In addition, or as an alternative to the example features described above connection with FIG. 2B, the AR product model presentation system 106 can provide additional features associated with providing a digital model 320 of the glasses 306 (or related products) within the camera interface 316. For example, as shown in FIG. 3B, the AR product model presentation system 106 can provide a menu of related products 322 including models 324a-e of glasses associated with the pair of glasses 306 portrayed within the camera interface 316. In one or more embodiments, a user of the mobile device 202 scrolls through the models 324a-e by swiping up or down across a touchscreen of the mobile device 202. As shown in FIG. 3B, a first model 324a corresponds to the digital model 320 of the glasses 306. As further shown, the additional models 324b-e correspond to different digital models associated with related products.

As further shown in FIG. 3B, the AR product model presentation system 106 provides a menu of different types of products 326 including product-type icons 328a-d corresponding to different types of products. For example, the menu of different types of products 326 includes a shirts icon 328a, pants icon 328b, hats icon 328c, and jewelry icon 328d. In one or more embodiments, the respective product-type icons 328a-d are associated with one or more digital models for products of the respective types of products. For example, in addition to accessing the digital models for the models 324a-e of different glasses, the AR product model presentation system 106 can additionally provide one or more models for different types of products that may be of interest to the user of the mobile device 202. Accordingly, in response to detecting a user selection of the shirts icon 328a (or other product-type icon), the networking system application 110 can identify and render one or more of the digital models for one or more shirts.

FIG. 3B additionally shows a product information icon 330. In response to detecting the product information icon 330, the AR product model presentation system 106 provides a product information window 332 including information about the pair of glasses 306 represented by the digital model 320. For example, the product information window 332 includes a description of the pair of glasses 306. The product information window 332 can additionally include price, color, size, or other relevant information about the product. In one or more embodiments, the additional information includes data from the digital model. Alternatively, in one or more embodiments, the additional information includes information obtained via the website/application shown in FIG. 3A (e.g., a product description).

In one or more embodiments, the AR product model presentation system 106 further provides an add to wardrobe option 334 including an option to add the product shown within the camera interface 316 to a list of products of interest to the user of the mobile device 202. For example, as shown in FIG. 3B, the product information window 332 includes an add to wardrobe option 334 that enables the user of the mobile device 202 to compile or add to an existing list of products. For example, in one or more embodiments, the AR product model presentation system 106 maintains a wardrobe for a user including a list of products including products the user has rated favorably or explicitly added to the list.

As an example, in response to detecting a selection of the add to wardrobe option 334, the networking system application 110 (or AR product model presentation system 106) can add the digital model of the corresponding product to a list associated with the user. In one or more embodiments, adding the product to the list causes the AR product model presentation system 106 to provide the digital model to be stored locally on the mobile device 202. In this way, the networking system application 110 can provide ready-access to the digital model (and other digital models for products on the list), even where the mobile device 202 does not have a reliable connection to the server device(s) 102. In addition, the networking system application 110 can provide ready-access to digital models for products on the list via selectable icons provided within a camera interface, even where a corresponding try on icon for the product has not been recently selected. For example, in one or more embodiments, the networking system application 110 provides a menu of selectable icons corresponding to products previously added to a wardrobe and corresponding to respective digital models stored on the mobile device 202.

Similar to the graphical user interface 204a described above in connection with FIG. 2B, the AR product model presentation system 106 can provide a shop now icon 336 to enable a user of the mobile device 202 to purchase the product corresponding to the digital model 320 shown in the camera interface 316. For example, the AR product model presentation system 106 can cause the mobile device 202 to navigate to a purchase interface provided via the webpage associated with the brand or merchant (e.g., as if the user had selected the my cart icon 312 of FIG. 3A). Alternatively, in one or more embodiments, the AR product model presentation system 106 provides a shopping interface via the networking system 104 to purchase the product through the networking system 104.

Figure 4B:
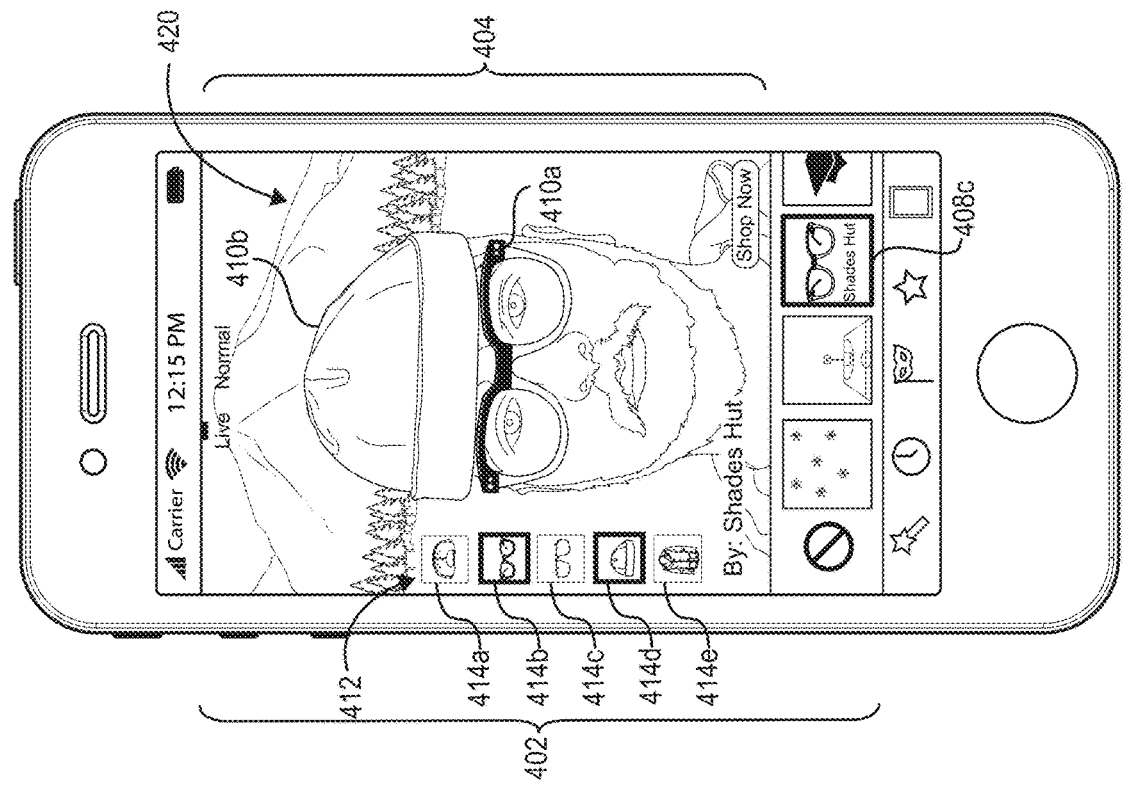
FIGS. 4A-4B illustrate example graphical user interfaces illustrating yet another augmented reality presentation in accordance with one or more embodiments.
Figure 4A:
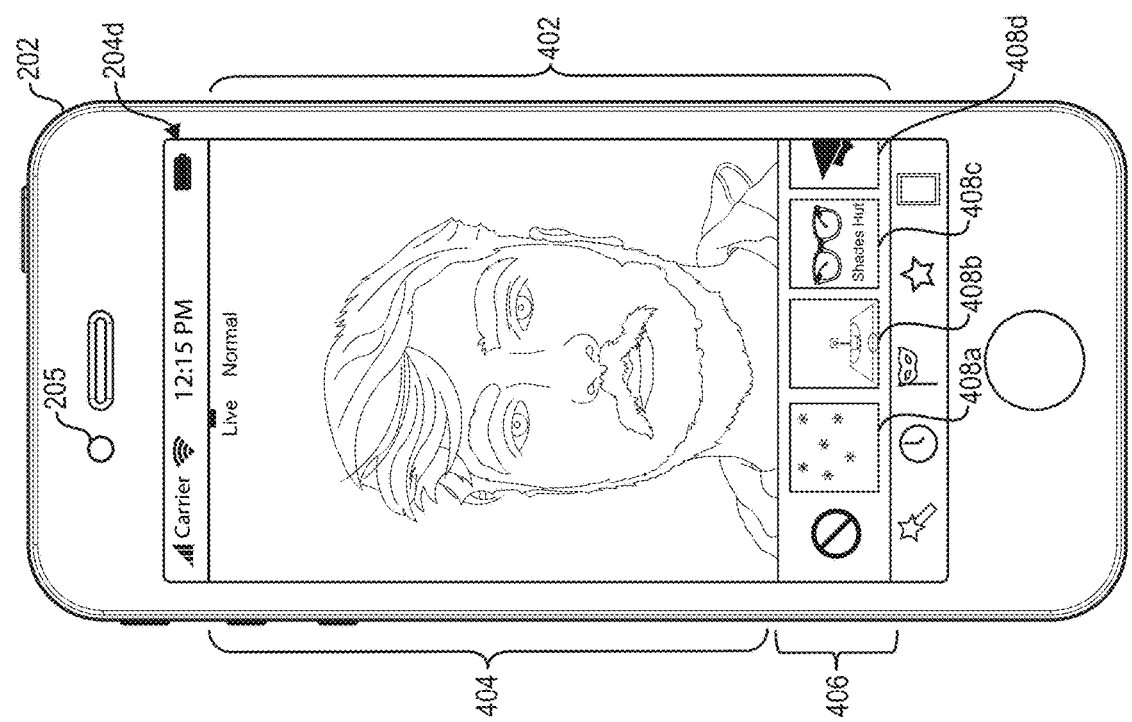

Similar to FIGS. 2A-3B, FIGS. 4A-4B illustrate a mobile device 202 including the graphical user interface 204d. In particular, as shown in FIG. 4A, the graphical user interface 204d includes a camera interface 402 of a networking system application 110. The camera interface 402 includes a camera stream 404 captured by the front camera 205 and an effects menu 406 including a plurality of effect icons 408a-d associated with respective augmented reality effects. The effect icons 408a-d can correspond to backgrounds, interactive objects (e.g., products), masks, filters, or other augmented reality effects that the networking system application 110 can provide in connection with the camera stream 404.

As shown in FIG. 4A, the effects menu 406 includes a sponsored product icon 408c associated with a product and/or respective brand. In one or more embodiments, the AR product model presentation system 106 enables a merchant, marketer, or other entity to bid for providing a sponsored product icon associated with a digital model of a corresponding product. As shown in FIG. 4A, the AR product model presentation system 106 provides the sponsored product icon 408c for a pair of glasses associated with a particular brand ("Shade Hut"). Accordingly, in response to detecting a user selection of the sponsored product icon 408c, the AR product model presentation system 106 can provide a digital model of a pair of glasses for the networking system application 110 to render within the camera interface 402. In one or more embodiments, the AR product model presentation system 106 provides other types of sponsored effects. For example, in addition to sponsored digital models of products (e.g., product masks), the AR product model presentation system 106 can provide sponsored backgrounds, frames, or other types of augmented reality effects.

In one or more embodiments, the AR product model presentation system 106 provides the digital model after (e.g., in response to) detecting a user selection of the sponsored product icon 408c. Alternatively, the AR product model presentation system 106 can provide the digital model prior to detecting the user selection. For example, in one or more embodiments, the AR product model presentation system 106 provides the digital model upon receiving a bid from a merchant or brand to promote the product within the effects menu 406. Accordingly, the networking system application 110 can provide the sponsored product icon 408c without submitting a request (e.g., response to detecting a user selection) for the corresponding digital model.

As shown in FIG. 4B, the AR product model presentation system 106 generate a AR experience including one or more digital models of products within the camera stream 404 (within the camera interface 402). In particular, as shown in FIG. 4B, the AR product model presentation system 106 provides a first digital model of a pair of glasses 410a and a second digital model of a hat 410b within the camera stream 404. Each of the digital models 410a-b correspond to respective digital models for the objects they represent.

As shown in FIG. 4B, the AR product model presentation system 106 provides a menu of related products 412 including product icons 414a-e for products related to the selected product icon 408c. For example, in response to detecting the user selection of the sponsored product icon 408c, the AR product model presentation system 106 provides the menu of related products 412 including one or more products of a similar brand (e.g., Products from Shades Hut) or similar type (e.g., different types of sunglasses from the same or different merchants). Each product icon 414a-e corresponds to an associated digital model of the product that the AR product model presentation system 106 can render within the camera stream 404.

In one or more embodiments, the AR product model presentation system 106 enables a user of the mobile device 202 to select one or multiple product icons 414a-e from the menu of related products 412. For example, as shown in FIG. 4B, a user of the mobile device 202 has selected both a second product icon 414b corresponding to a pair of glasses and a fourth product icon 414d corresponding to a hat. As reflected in the camera stream 404, the AR product model presentation system 106 renders the first digital model of the pair of glasses 410a based on the selection of the second product icon 414b and further renders the second digital model of the hat 410b based on the selection of the fourth product icon 414d. Similar to one or more embodiments described herein, the AR product model presentation system 106 positions the digital models for the products 410a-b within the camera stream 404 in accordance with features of a face identified within the camera stream 404.

In addition to providing the product model as a part of an AR experience, the AR product model presentation system 106 can also provide additional AR effects. For example, as shown in FIG. 4B, the AR product model presentation system 106 provides a background 420 including background content that further enhances the AR presentation. For example, based on detecting a user selection of the hat 410b (e.g., a beanie), the AR product model presentation system 106 can provide a background 420 related to the product. For example, FIG. 4B illustrates that the AR product model presentation system 106 provides a background including mountains and trees (e.g., a winter background) as part of the AR product presentation. In one or more embodiments, the AR product model presentation system 106 identifies and renders a background based on a predefined association between a product (or the digital model) and background identified by a merchant, marketer, or other entity associated with the product (e.g., a snowy background for ski or winter-related products, a beach background for beach or summer-related products). Alternatively, in one or more embodiments, the AR product model presentation system 106 enables a user to select one or more background effects to further enhance the digital presentation of the selected product.

As shown in FIG. 4B, the displayed background 420 includes a static image including a mountain and trees positioned behind the detected face of a person shown within the AR presentation. Alternatively, in one or more embodiments, the displayed background 420 includes a dynamic presentation including one or more moving objects (e.g., animals, wind, snow) to further enhance the presentation. In one or more embodiments, the background 420 further includes AR effects or animations shown in connection with a display of the digital model of the object(s). For example, in addition to the mountain and trees, the background 420 can include a snow animation showing snow falling behind and/or in front of the person and/or product shown within the AR presentation.

The AR product model presentation system 106 can render the background 420 in a variety of ways. For example, in one or more embodiments, the AR product model presentation system 106 filters the camera stream 404 to include a foreground portion of the captured video displayed in conjunction with the background 420. For instance, in one or more embodiments, the AR product model presentation system 106 segments the camera stream 404 by detecting a foreground portion and background portion of the camera stream 404. Segmenting the camera stream 404 can include detecting objects (e.g., faces, profiles, bodies), performing edge detection, analyzing patches of sequential images (e.g., video frames) and designating a foreground portion of the camera stream 404 to display while filtering out any background portion(s) of the camera stream 404. The AR product model presentation system 106 can further provide the AR background 420 in place of the filtered-out background portion of the designated background of the camera stream 404.

Figure 5:
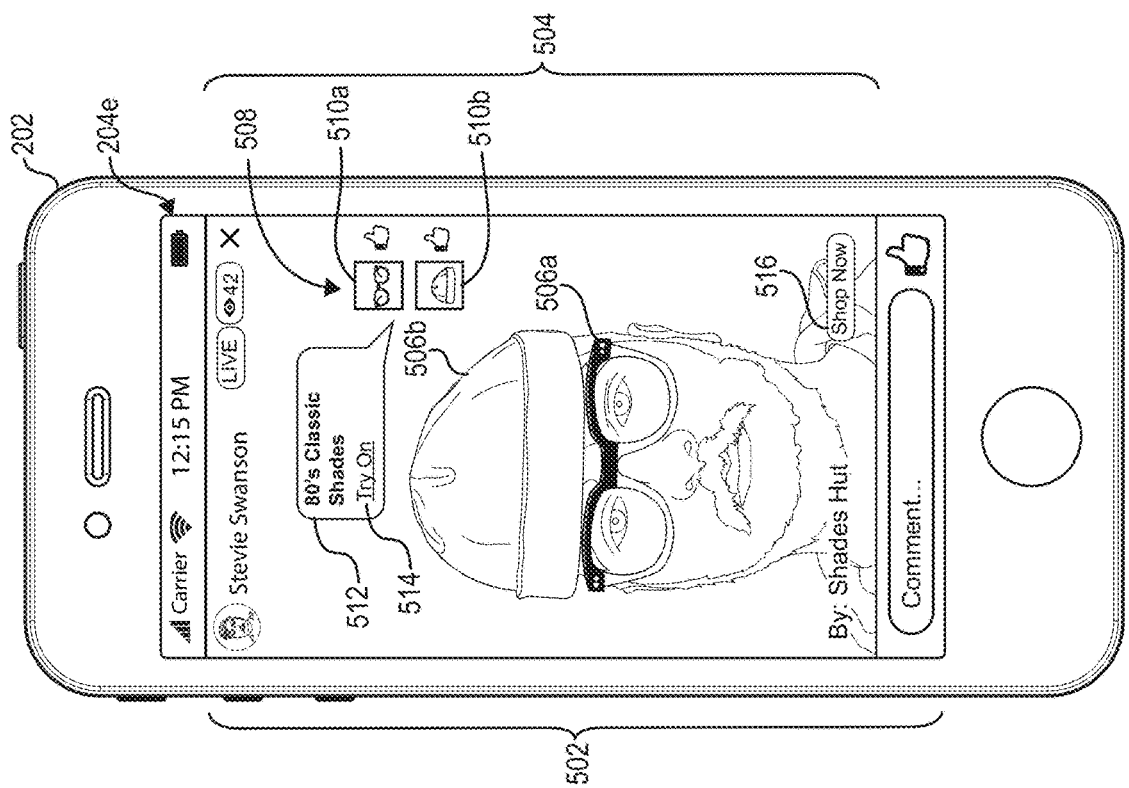
FIG. 5 illustrates an example graphical user interface including an augmented reality presentation in accordance with one or more embodiments.

FIG. 5 illustrates yet another example graphical user interface 204e displayed via a mobile device 202a in accordance with one or more embodiments described herein. In particular, as shown in FIG. 5, an AR product model presentation system 106 provides a live video interface 502 including a live video stream 504 broadcast by another client device 202 and provided to the mobile device 202a via the networking system 104. For example, the live video stream 504 includes a video stream shared by a broadcasting user to a user of the viewing client device 202a. In particular, the live video interface 502 provides a viewer's perspective of the camera stream 404 described above in connection with FIG. 4B. Accordingly, in one or more embodiments, FIG. 4B illustrates an example perspective of the live video stream from a broadcasting client device 202, while FIG. 5 illustrates an example perspective of the live stream from a viewer client device 202a. While FIG. 5 illustrates an example in which the AR product model presentation system 106 provides an augmented reality presentation via the mobile device 202a, it will be understood that features and functionality described in connection with the live video stream of FIG. 5 can similarly apply to other types of digital content (e.g., user-generated digital content) shared by various users of the networking system.

As shown in FIG. 5, the live video interface 502 includes augmented reality effects provided within the live video stream 504 similar to the effects described above in connection with FIGS. 4A-4B. In particular, as shown in FIG. 5, the live video interface 502 includes a first digital model of a pair of glasses 506a and a second digital model of a hat 506b. In addition, each of the digital models of the products are positioned over a face shown within the live video feed based on features of the face identified locally by the networking system application 110 on the broadcasting client device 202.

As further shown, the AR product model presentation system 106 provides a products menu 508 including product icons 510a-b for each of the products shown within the live video stream 504. In particular, the products menu 508 includes a first icon 510a for the pair of glasses and a second icon 510b for the hat. The AR product model presentation system 106 additionally provides an option for a user to rate (e.g., thumbs up) a product and provide to a broadcasting user a rating of the products the broadcasting user has tried on. In this way, a broadcasting user can receive instantaneous feedback for the products from viewers of the live video stream 504. As an alternative to generally rating a product portrayed within the live video stream, the AR product model presentation system 106 can provide a poll that enables viewing users to vote between one or more products portrayed within the live video stream.

In one or more embodiments, the AR product model presentation system 106 provides an additional information window 512 for one or more of the products shown within the live video stream 504. For example, in response to detecting a user selection of the first icon 510a for the pair of glasses, the AR product model presentation system 106 provides the additional information window 512 including a product description ("80's Classic Shades"). The additional information window 512 can include price information, brand information, store/location information, color information, and other data associated with the corresponding product.

As further shown, the AR product model presentation system 106 can provide a try on option 514 that enables a viewer of the live video stream 504 to try on one or more of the products shown within the live video stream 504. For example, FIG. 5 shows a try on icon 514 within the additional information window 512 including similar features and functionality as other try on options described herein. For example, in one or more embodiments, detecting a selection of the try on icon 514 causes the AR product model presentation system 106 to obtain a copy of the digital model for the selected product and render the digital model of the product with a camera stream captured by a camera of the mobile device 202a. Accordingly, in response to detecting a user selection of the try on icon 514, a networking system application 110 on the mobile device 202a can activate a camera interface similar to other camera interfaces described herein and render a digital model of the product within the camera interface. The networking system application 110 can additionally provide various options, icons, and various features and functionality similarly described in FIGS. 2A-4B.

In addition to trying on the products shown within the live video stream 504, in one or more embodiments, the AR product model presentation system 106 enables a viewer of the live video stream 504 to purchase one or more products shown within the live video stream 504. For example, FIG. 5 shows an example shop now icon 516 that enables a user of the mobile device 202 to purchase one or more of the products associated with the digital models shown within the live video stream 504. In particular, in response to detecting a user selection of the shop now icon 516, the AR product model presentation system 106 can provide a shopping interface including an option to buy a selected product (e.g., the pair of glasses) or any of the products shown within the live video stream 504.

While FIGS. 2A-5 illustrate examples in which an augmented reality presentation is provided within a camera interface of the networking system application 110, the AR product model presentation system 106 can provide an augmented reality presentation in-line with a feed (e.g., a social networking feed) or within a feed of an associated user. For example, in one or more embodiments, the AR product model presentation system 106 enables a user to share a video including the digital model of a product within a newsfeed accessible to other users of the networking system 104. In providing the shared video to other users within respective newsfeeds, the AR product model presentation system 106 can provide a try on icon associated with the product(s) shown within the shared video similar to one or more embodiments described herein. Accordingly, in addition to sponsored ads or posts shared by various merchants and advertisers, the AR product model presentation system 106 additionally provides the product link (e.g., try on icon) in connection with digital media shared by other users of the networking system 104.

Figure 6:
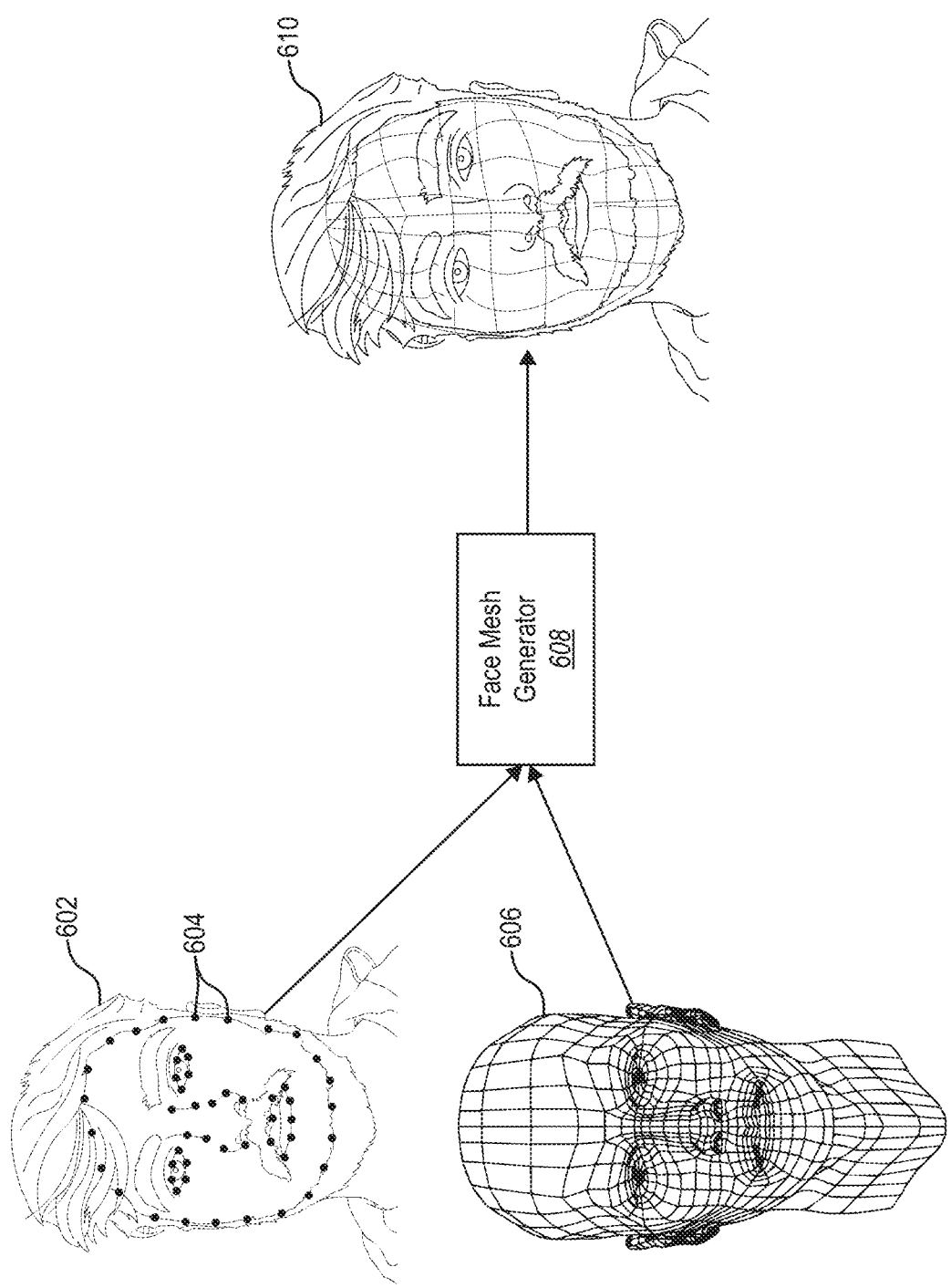
FIG. 6 illustrate an example workflow for generating a personalized mesh model for a face in accordance with one or more embodiments.
Figure 7:
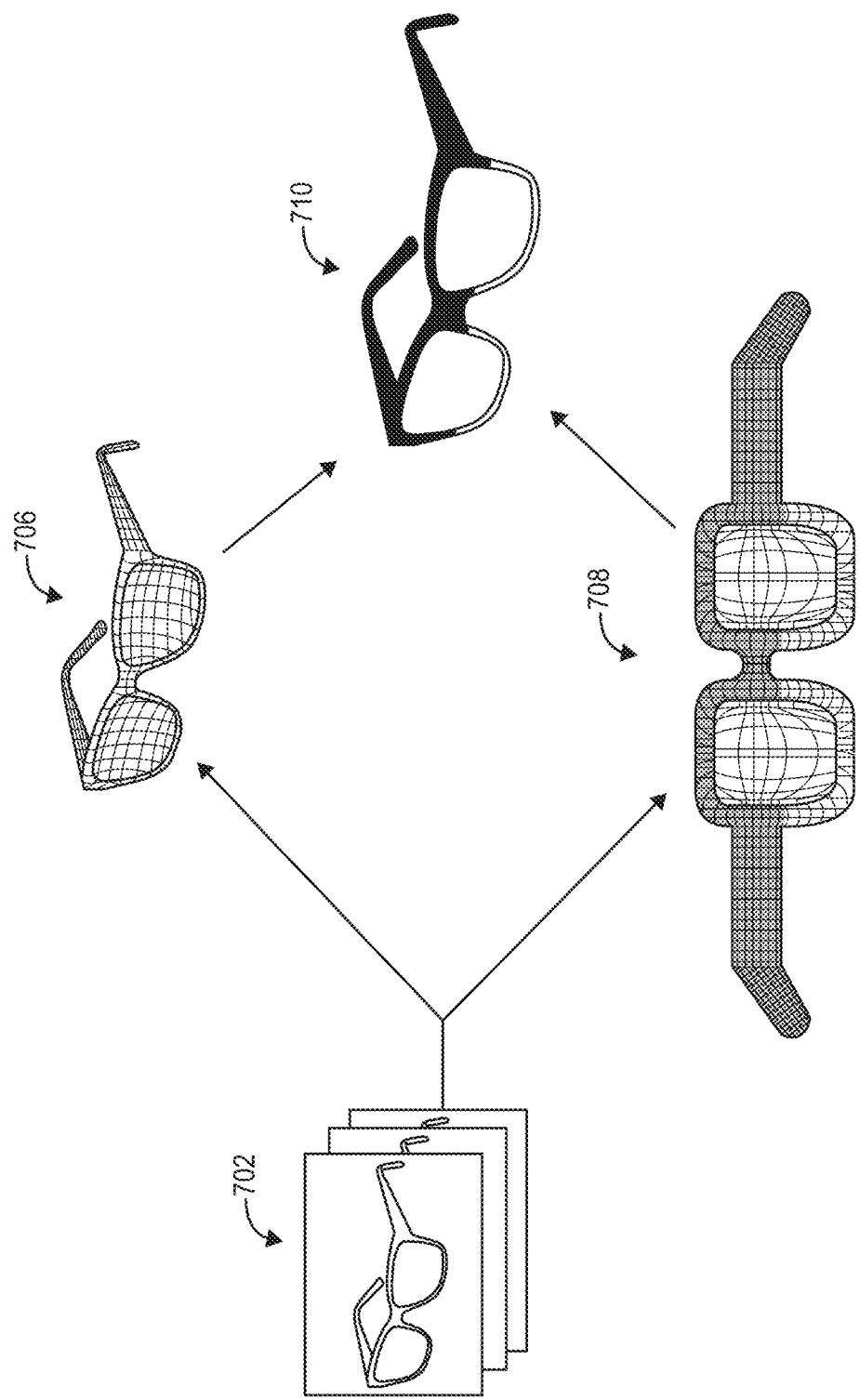
FIG. 7 illustrates an example workflow for generating a digital model for an object in accordance with one or more embodiments.
Figure 8:
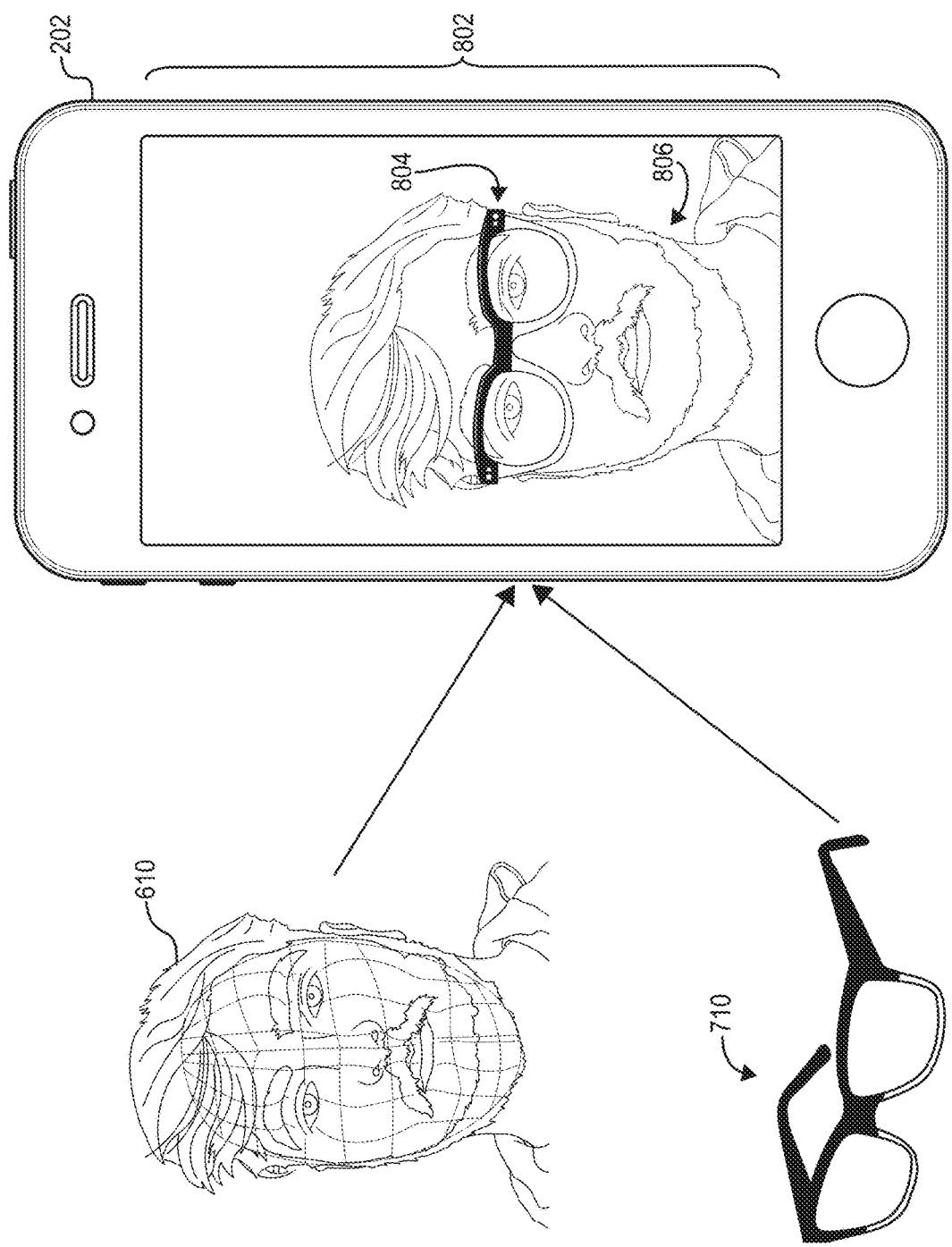
FIG. 8 illustrates an example workflow for combining a personalized mesh model and digital model to generate an AR presentation in accordance with one or more embodiments.

As described in one or more embodiments herein, the AR product model presentation system 106 can provide a digital presentation including a digital model of a product based on a digital model for the product displayed in connection with dynamic content shown within a camera stream. The AR product model presentation system 106 can generate the digital presentation in a variety of ways. By way of example, FIGS. 6-8 illustrate one or more example techniques and methods for generating a digital model for an object and rendering the object within a live video stream in connection with content (e.g., faces, profiles, etc.) displayed therein. In particular, FIGS. 6-8 illustrate one or more example techniques and methods for displaying a digital model of a pair of glasses in connection with a detected face shown within a camera stream captured by a client device.

In generating an AR presentation, in one or more embodiments, the AR product model presentation system 106 generates a mesh model for a face. The AR product model presentation system 106 can generate the mesh model for the face in a variety of ways. As an illustrative example shown in FIG. 6, the AR product model presentation system 106 can generate a feature map 602 (e.g., a two-dimensional mapping) for a face including reference features 604 positioned about a face of an individual shown within a camera stream. In one or more embodiments, the AR product model presentation system 106 analyzes one or more video frames to generate the feature map 602 including detected reference features 604.

As shown in FIG. 6, the feature map 602 includes detected edges of facial features including, for example, eyes, eyebrows, a nose, lips, and other detected features of a face. In addition to generally mapping detected objects, the AR product model presentation system 106 can further map contours, wrinkles, and other more detailed features of the detected face. In one or more embodiments, the AR product model presentation system 106 can map coloring features and other appearance-based features shown within one or more images of the face.

While FIG. 6 shows an example in which a single image of a face is mapped, the AR product model presentation system 106 can further refine identified locations of the reference features 604 by analyzing multiple video frames (e.g., consecutive video frames) of the captured stream. As an example, the AR product model presentation system 106 can analyze an initial frame of a camera stream (e.g., a key frame) and further compute locations of the reference features 604 at previous or subsequent video frames. The AR product model presentation system 106 can further apply weighting factors based on detected movement between frames and estimation of optical flow between video frames. In one or more embodiments, the AR product model presentation system 106 utilizes the following algorithms to refine determined locations of reference features 604:

$$x_i^t = \lambda_i x_{f,i}^t + (1 - \lambda_i) x_{o,i}^t \text{ for } 1 \le i \le m$$

$$x_o^t = x^T + \sum_{T \le i < t} w^i$$

Where t is the time of a video frame, $0 \le \lambda \le 1$ is a weighting factor, $x_f^t$ is a feature position obtained at time t, and $x_o^t$ is an estimated feature location. Further, $x^T$ denotes a feature position in a key frame $f_t^T$ and $w^i$ is the forward optical flow vector from t to t+1 in $x_o^t$. In one or more embodiments, the AR product model presentation system 106 utilizes the optical flow-based feature correction process described in *Reconstructing Detailed Dynamic Face Geometry From Monocular Video* by Garrido et al., which is incorporated herein by reference in its entirety.

In addition to generating and refining the feature map 602, the AR product model presentation system 106 further utilizes a default mesh model 606 in conjunction with the feature map 602 to generate a personalized mesh model 610 for a detected face. In particular, in one or more embodiments, the AR product model presentation system 106 identifies a default mesh model 606 including a three-dimensional model of a generic face that includes a number of vertices that define various points on the face. The default mesh model 606 can include any number of vertices and gridlines depending on computing capabilities of a client device. In addition, the AR product model presentation system 106 can select a particular default mesh model 606 based on a detected position or angle of the detected face to further improve upon the accuracy of generating the personalized mesh model 610.

As shown in FIG. 6, the AR product model presentation system 106 can implement a face mesh generator 608 to generate a personalized mesh model 610 based on the default mesh model 606 and including grid lines and vertices that reflect locations of the reference features 604 of the feature map 602. In particular, in one or more embodiments, the AR product model presentation system 106 generates the personalized mesh model 610 by manipulating vertices of the default mesh model 606 based on locations of the reference features 604. In one or more embodiments, the AR product model presentation system 106 refines the personalized mesh model 610 over time to reflect refined positions of the reference features 604 and/or to reflect more accurate or efficient modeling methods utilized over time to generate the personalized mesh model 610.

As shown in FIG. 6, the AR product model presentation system 106 can generate a single personalized mesh model 610 including a three-dimensional mesh that reflects an entire face, portion of a face, and/or larger profile including the neck and torso of an individual. In one or more embodiments, the AR product model presentation system 106 generates multiple personalized mesh models for different angles of a face or profile. For example, the AR product model presentation system 106 can generate and utilize a personalized mesh model 610 based on detecting a face looking at the camera. The AR product model presentation system 106 can similarly generate and utilize a different personalized mesh model based on different angles of an individual looking down, up, to the side, or based on a variety of angles of the face to improve accuracy of providing a digital presentation.

In addition to generating the mesh model for the face or profile of an individual, the AR product model presentation system 106 can additionally obtain or otherwise generate a digital model for a product including data for rendering a three-dimensional representation of the model to be displayed in connection with content shown within a camera stream. As mentioned above, in one or more embodiments, the AR product model presentation system 106 generates the digital model based on images or three-dimensional model of the product. Alternatively, in one or more embodiments, the AR product model presentation system 106 receives the digital model from a third-party source.

FIG. 7 illustrates an example workflow for generating a digital model 710 for a pair of glasses in accordance with one or more embodiments herein. For example, in one or more embodiments, the AR product model presentation system 106 receives one or more two-dimensional images 702 of the pair of glasses and generates a digital model 710 based on the two-dimensional images 702. For instance, the AR product model presentation system 106 can generate a digital model 710 for the pair of glasses by obtaining multiple images that show the pair of glasses from multiple angles. The AR product model presentation system 106 can generate the digital model 710 by collecting a series of points in space from the images 702 and generate a model that includes depth information and appearance data for the pair of glasses. The AR product model presentation system 106 can generate the digital model 710 based on the depth information and appearance data. Alternatively, in one or more embodiments, the AR product model presentation system 106 receives a previously generated three-dimensional model for the object.

In one or more embodiments, the AR product model presentation system generates a three-dimensional mesh 706 for the pair of glasses representative of a three-dimensional structure for the pair of glasses. In one or more embodiments, the AR product model presentation system 106 generates the three-dimensional mesh 706 utilizing similar techniques as described above in connection with generating the personalized mesh model 610 for the face. Alternatively, in one or more embodiments, the AR product model presentation system 106 extrapolates the mesh 706 for the glasses based on the three-images 702, as shown in FIG. 7.

In one or more embodiments, the AR product model presentation system 106 generates a mesh including any number of edges and vertices that reflect the structure and contours of the object. The AR product model presentation system 106 can generate a high-resolution mesh or, alternatively, down-sample or decimate the three-dimensional model 704 based on a number of reference points (e.g., reference features 604) and/or computing capabilities of a client device. As shown in FIG. 7, the mesh model 706 for the pair of glasses includes vertices and connected lines that illustrate a structure and shape of the glasses.

In addition to generating the mesh model 706, the AR product model presentation system 106 can additionally map any number of vertices of the mesh model 706 to reference points of another object. For example, in one or more embodiments, the AR product model presentation system 106 maps specific vertices of the mesh model 706 to predefined reference features 604 corresponding to the feature map 602 generated for a face or profile. In this way, the AR product model presentation system 106 can map specific vertices of the mesh model 706 to move relative to moving reference features 604 of the face, thus creating a realistic representation of the product shown within the AR presentation. To illustrate, the AR product model presentation system 106 can map vertices at various locations on the glasses (e.g., lenses, frames, bridge, etc.) to corresponding reference features 602 (e.g., nose, eyebrows, eyes, etc.) of a detected face.

As further shown in FIG. 7, the AR product model presentation system 106 can generate a UV map 708 including additional information associated with an appearance of the pair of glasses. In particular, the UV map 708 can refer to a two-dimensional representation of the three-dimensional model 708 including color, surface features, and other appearance-related data mapped to specific faces of the mesh model 706. The AR product model presentation system 106 can generate the UV map 708 using a number of methods or techniques.

As an example, in one or more embodiments, the AR product model presentation system 106 generates the UV map 708 by performing a UV parameterization of the three-dimensional model. For example, the AR product model presentation system 106 can utilize various UV parameterization techniques including, for example, barycentric mapping, differential geometry, and/or various non-linear methods to generate UV map 708 including a UV-coordinate mapping between appearance data for the pair of glasses and corresponding faces, edges, and vertices of the mesh model 706. In one or more embodiments, the AR product model presentation system 106 utilizes a conformal flattening algorithm to compute u-v coordinates for between a surface of the three-dimensional model 704 and each vertex of the mesh model 706 reflected in the surface UV map 708.

As shown in FIG. 7, the AR product model presentation system 106 generates a digital model 710 for the pair of glasses by combining the mesh model 706 and UV map 708. In one or more embodiments, the AR product model presentation system 106 generates the digital model 710 by wrapping the UV map 708 around the mesh model 706, thus combining the depth data and interaction data of the mesh model 706 with appearance data of the UV map 708.

Utilizing the personalized mesh model 610 and the digital model 710 including the mesh model 706 and UV map 708, the AR product model presentation system 106 can generate and provide the AR presentation in accordance with one or more embodiments described herein. For example, as shown in FIG. 8, the AR product model presentation system 106, the AR product model presentation system 106 provides an AR presentation 802 including a digital model of the pair of glasses 804 displayed at a position corresponding to a detected face 806 within a camera stream. The AR presentation 802 can include similar features as described above in connection with FIGS. 2A-5.

As shown in FIG. 8, while the AR product model presentation system 106 utilizes the personalized mesh model 610 and digital model 710 for the pair of glasses, it is noted that the personalized mesh model 706 for the individual's face as well as the mesh model 708 for the pair of glasses are transparent to a user of the client device 202. Indeed, while the AR product model presentation system 106 utilizes depth information from each of the mesh models 610, 710 to render the digital model of the pair of glasses 804 including displayed appearance data from the UV map 708 (e.g., mapped to corresponding reference features 604 of the detected face 806), the AR product model presentation system 106 does not display the lines or vertices of the mesh models 610, 710 via the graphical user interface of the client device 202.

Accordingly, the AR product model presentation system 106 renders the digital model of the pair of glasses 804 at a position on the detected face 806 in accordance with vertices of the digital model 710 (e.g., vertices of the mesh model 706 and UV map 708) and corresponding reference features 604 of the personalized mesh model 610. As an individual moves while capturing and broadcasting the camera stream, the AR product model presentation system 106 can update a position of the digital model of the pair of glasses 804 to correspond to changing locations of the reference features 604, thereby providing a realistic representation of the pair of glasses as they would appear on an individual.

Figure 9:
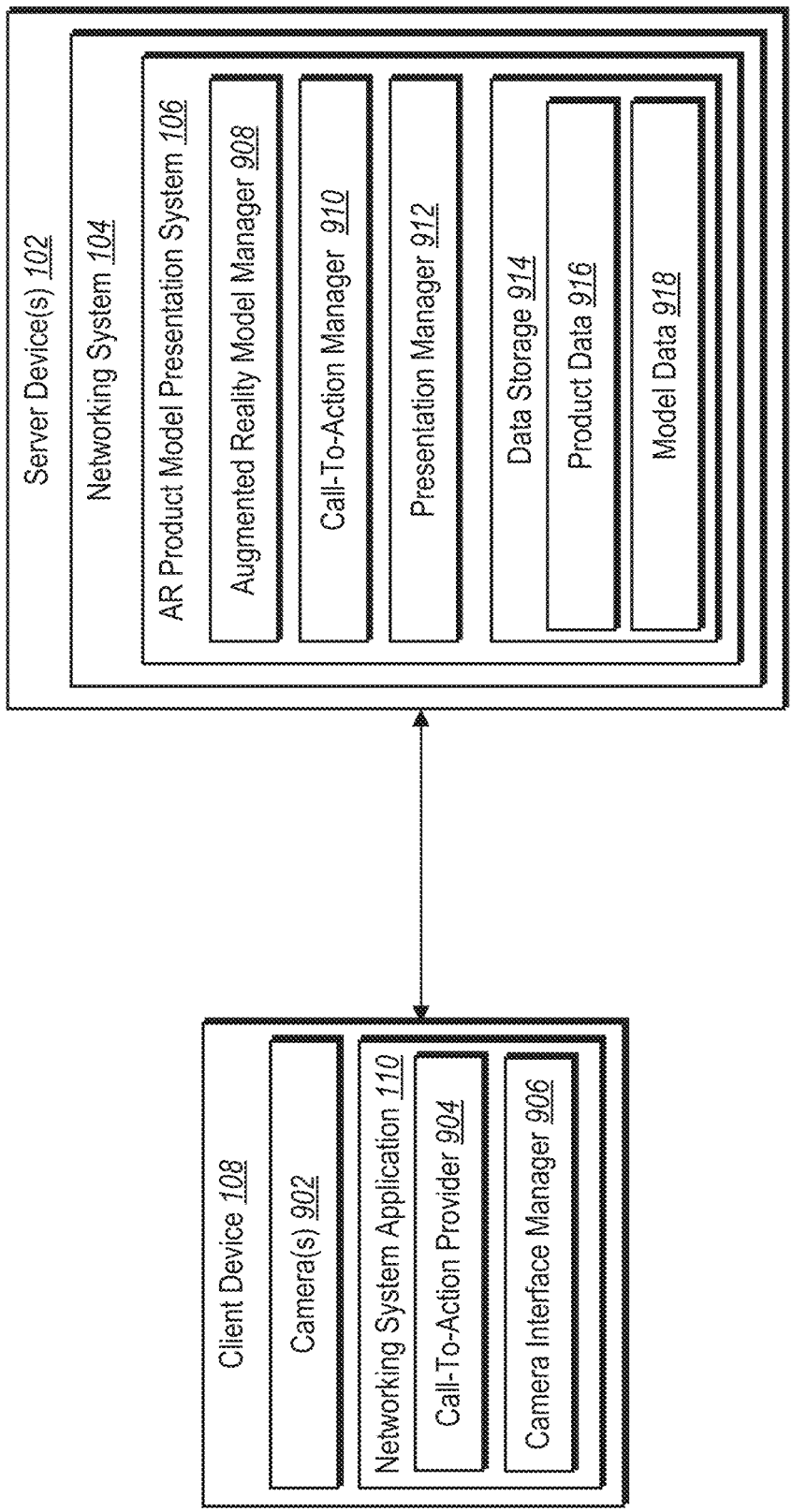
FIG. 9 illustrates a schematic diagram of an AR product model presentation system implemented on a server device(s) in accordance with one or more embodiments.

Turning now to FIG. 9, additional detail will be provided regarding components and capabilities of example architecture for the AR product model presentation system 106 that may be implemented within the communication environment 100 described above in connection with FIG. 1. In particular, FIG. 9 illustrates an example client device 108 and server device(s) 102 having similar features and functionality associated with one or more embodiments described above. For example, the AR product model presentation system 106 and networking system application 110 can cooperate to provide an augmented reality presentation including a camera stream and a digital model of a product.

As shown in FIG. 9, the client device 108 includes one or more cameras 902 and a networking system application 110. The networking system application 110 includes a call-to-action provider 904 and a camera interface manager 906. As further shown, the server device(s) 102 includes a networking system 104, which includes an AR product model presentation system 106. The AR product model presentation system 106 includes a digital model manager 908, a call-to-action manager 910, a presentation manager 912, and a data storage 914 including product data 916 and model data 918. While FIG. 9 shows one example embodiments in which components 904-906 are implemented on the server device(s) 102 and components 908-918 are implemented on the server device(s) 102, it will be understood that one or more of the components 904-918 may be implemented wholly or partially on the server device(s) 102, client device 108, or a combination of the illustrated devices. In addition, or as an alternative, one or more of the components 904-918 may be implemented on a merchant device 114, as discussed above in connection with FIG. 1.

As shown in FIG. 9, client device 108 includes one or more cameras 902. For example, where the client device 108 refers to a mobile device (e.g., a smart phone), the client device 108 can include one or more front cameras or back cameras. In one or more embodiments, the networking system application 110 activates one or more of the camera(s) 902 to capture one or more images or a video. For example, the camera(s) 902 can capture a camera stream including a series of images or a video. The networking system application 110 can upload, broadcast, stream, or otherwise transmit the camera stream. In one or more embodiments, the networking system application 110 stores the camera stream on the client device 108.

As further shown in FIG. 9, the networking system application 110 includes a call-to-action provider 904 that provides a product link via a graphical user interface of the client device 108. For example, in one or more embodiments, the call-to-action provider 904 provides a try on icon in connection with digital media associated with a product. For instance, the call-to-action provider 904 can detect that digital media provided via a graphical user interface of the client device 108 is associated with a product and provide a selectable try on icon in connection with the digital media.

The call-to-action provider 904 can additionally detect a user selection of the product link. For example, in response to detecting a user selection of a product link, the call-to-action provider 904 can execute one or more instructions included within the product link. In one or more embodiments, in response to detecting a user selection of the product link, the call-to-action provider 904 provides a request to the AR product model presentation system 106 for a copy of a digital model of a corresponding product. In one or more embodiments, the call-to-action provider 904 additionally indicates to the camera interface manager 906 that the product link has been selected.

As another example, in one or more embodiments, the AR product model presentation system 106 captures a camera stream and renders a digital model of a product within a newsfeed. For example, rather than rendering a digital model of a product within a shared video stream from another user, the AR product model presentation system 106 may capture a camera stream using a front camera 205 of the client device 202 and provide the camera stream showing a face of the user of the mobile device 202 in connection with a digital model of a product that a merchant, marketer, or other entity hopes to promote. Accordingly, as an alternative to seeing a post including a digital image for a product, the user of the mobile device 202 can see a camera stream captured by the mobile device and including the digital model of the product. In addition, similar to one or more embodiments described herein, the AR product model presentation system 106 can provide a product link in connection with the post that triggers activating the camera interface of the networking system application 110 and providing an augmented reality presentation similar to one or more embodiments described herein.

As further shown in FIG. 9, the networking system application 110 includes a camera interface manager 906. In one or more embodiments, the camera interface manager 906 activates a camera interface. For example, the camera interface manager 906 can initiate capturing a camera stream by the camera(s) 902. In addition, the camera interface manager 906 can open a camera interface of the networking system application 110 that includes the camera stream as well as one or more controls for modifying a presentation of the camera stream. For example, the camera interface manager 906 can provide controls that enable a user of the client device 108 to add effects (e.g., masks, backgrounds, etc.). In addition, the camera interface manager 906 can provide controls for switching between cameras 902 of the client device (e.g., switch from a front camera to a back camera). The camera interface manager 906 can further provide controls for modifying brightness, flash, or other camera settings.

In addition to providing the camera stream, the camera interface manager 906 can additionally implement one or more digital models for corresponding products in connection with the camera stream. For example, as indicated above, in addition to a digital model of a product, an augmented reality mode can include interactive data associated with rendering the digital model in connection with a camera stream. In one or more embodiments, the camera interface manager 906 renders the digital model of the product within the camera stream in accordance with the interactive data of the digital model.

As an example, the camera interface manager 906 can identify a face and features of the identified face within a camera stream. Where the digital model includes a digital model of a pair of glasses as well as interactive data that indicates how the pair of glasses should interact with detected eyes, forehead, nose, and ears, the camera interface manager 906 can render the digital model of the pair of glasses in relation to the detected features of the identified face. Accordingly, the camera interface manager 906 can position the digital model of the pair of glasses as they would appear on an individual wearing the physical pair of glasses.

In one or more embodiments, the camera interface manager 906 updates the position of the digital model based on moving content within the camera stream. For example, where the identified face moves, rotates, or otherwise causes the content shown within the camera stream to change, the camera interface manager 906 can update an angle, position, or other characteristic of the digital model to match the changing content of the camera stream. Accordingly, the camera interface manager 906 can provide a realistic representation of the product within a live video stream or other series of images captured by the camera(s) 902.

As shown in FIG. 9, the AR product model presentation system 106 includes a digital model manager 908. In one or more embodiments, the digital model manager 908 generates digital models for corresponding products. For example, the digital model manager 908 generates digital models of products and instructions for rendering the digital models of the products within a camera stream. The digital model manager 908 can generate a digital model on the server device(s) 102. Alternatively, the digital model manager 908 can receive one or more previously generated digital models from other devices (e.g., a merchant device 114).

In one or more embodiments, the digital model manager 908 generates a digital model based on an image, series of images, or video that portrays a product. In particular, the digital model manager 908 can generate a frame of a product including a three-dimensional representation of the product. In addition, the digital model manager 908 can generate a mask that includes a digital model of the product based on the three-dimensional frame for the product. In one or more embodiments, the digital model manager 908 further generates behavior or interactive data that includes instructions for rendering the mark and wire frame in connection with content shown within a camera stream. As an example, the AR product model presentation system 106 can create a digital model of a merchant based on a plurality of images showing different perspectives of a product provided by the merchant.

In addition to generating or receiving the digital model(s), the digital model manager 908 can manage access to the digital models. For example, the digital model manager 908 may maintain a database of digital models for a catalog of products and provide copies of the digital models to the client device 108 upon request. For example, in response to detecting a user selection of a product link, the digital model manager 908 can provide a copy or provide remote access to a digital model that enables the camera interface manager 906 to render a digital model of a product within a camera interface on the client device 108. The digital model manager 908 can store any number of digital models via a data storage 914 of the server device(s) 102. Alternatively, the digital model manager 908 can remotely access digital models stored on third-party devices (e.g., on a merchant device 114).

As further shown in FIG. 9, the AR product model presentation system 106 includes a call-to-action manager 910. In one or more embodiments, the call-to-action manager 910 provides a product link for one or more corresponding products associated with digital models. For example, the call-to-action manager 910 can provide a product link within a newsfeed, profile page, or other graphical user interface associated with the networking system 104. The call-to-action manager 910 can further provide a product link within a live stream shared to users of the networking system 104 in which a digital model of a product is shown.

In addition to providing product links within graphical user interfaces associated with the networking system 104, the call-to-action manager 910 can further provide product links via web pages. For example, in one or more embodiments, the call-to-action manager 910 identifies a product shown within digital media and provides a product link over a portion or otherwise in connection with the digital media. Alternatively, in one or more embodiments, the call-to-action manager 910 provides access to instructions for creating a product link and enables a third-party device (e.g., a merchant device 114) to create a product link and provide the product link in connection with content shown via the third-party web page.

As further shown in FIG. 9, the AR product model presentation system 106 includes a presentation manager 912. In one or more embodiments, the presentation manager 912 provides the digital model including the digital model of the product and instructions for rendering the product to the client device 108 to be locally rendered by the networking system application 110. Alternatively, the presentation manager 912 can remotely render the digital model via the camera interface. For example, where the camera interface includes a web browser interface provided by the AR product model presentation system 106, the presentation manager 912 can render the digital model of the object directly within the web interface.

As further shown in FIG. 9, the AR product model presentation system 106 includes a data storage 914 including product data 916. The product data 916 can include any data associated with a product including, for example, a brand, merchant, price, website, or other data associated with a respective product. In one or more embodiments, the product data 916 includes digital media (e.g., images, videos) in which a product is portrayed and which the AR product model presentation system 106 can use to identify placement of a product link in connection with the digital media. In addition, the product data 916 can include data that relates one or more models with other models. For example, the AR product model presentation system 106 can utilize the product data 916 to identify one or more related products to a given product.

As further shown, data storage includes model data 918. The model data 918 can include any data that makes up a digital model. For example, the model data 918 can include data for generating a three-dimensional digital model of a product. In addition, the model data 918 can include data for rending the digital model in connection with a camera stream provided within a camera interface. For example, the model data 918 can include interactive data that dictates behavior or placement of the digital model of the digital model of the product in connection with detected content shown within a camera stream.

Each of the components 902-918 can comprise software, hardware, or both. For example, the components 902-918 can comprise one or more instructions stored on a computer-readable storage medium and executable by processors of one or more computing devices. When executed by the one or more processors, the computer-executable instructions of the AR product model presentation system 106 can cause a client device and/or a server device to perform the methods described herein. Alternatively, the components 902-918 and their corresponding elements can comprise hardware, such as a special purpose processing device to perform a certain function or group of functions. Additionally, the components 902-918 can comprise a combination of computer-executable instructions and hardware.

Furthermore, the components 902-918 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-918 may be implemented as a stand-alone application, such as a desktop or mobile application. Furthermore, the components 902-918 may be implemented as one or more web-based applications hosted on a remote server. The components 902-918 may also be implemented in a suit of mobile device applications or "apps."

Figure 10:
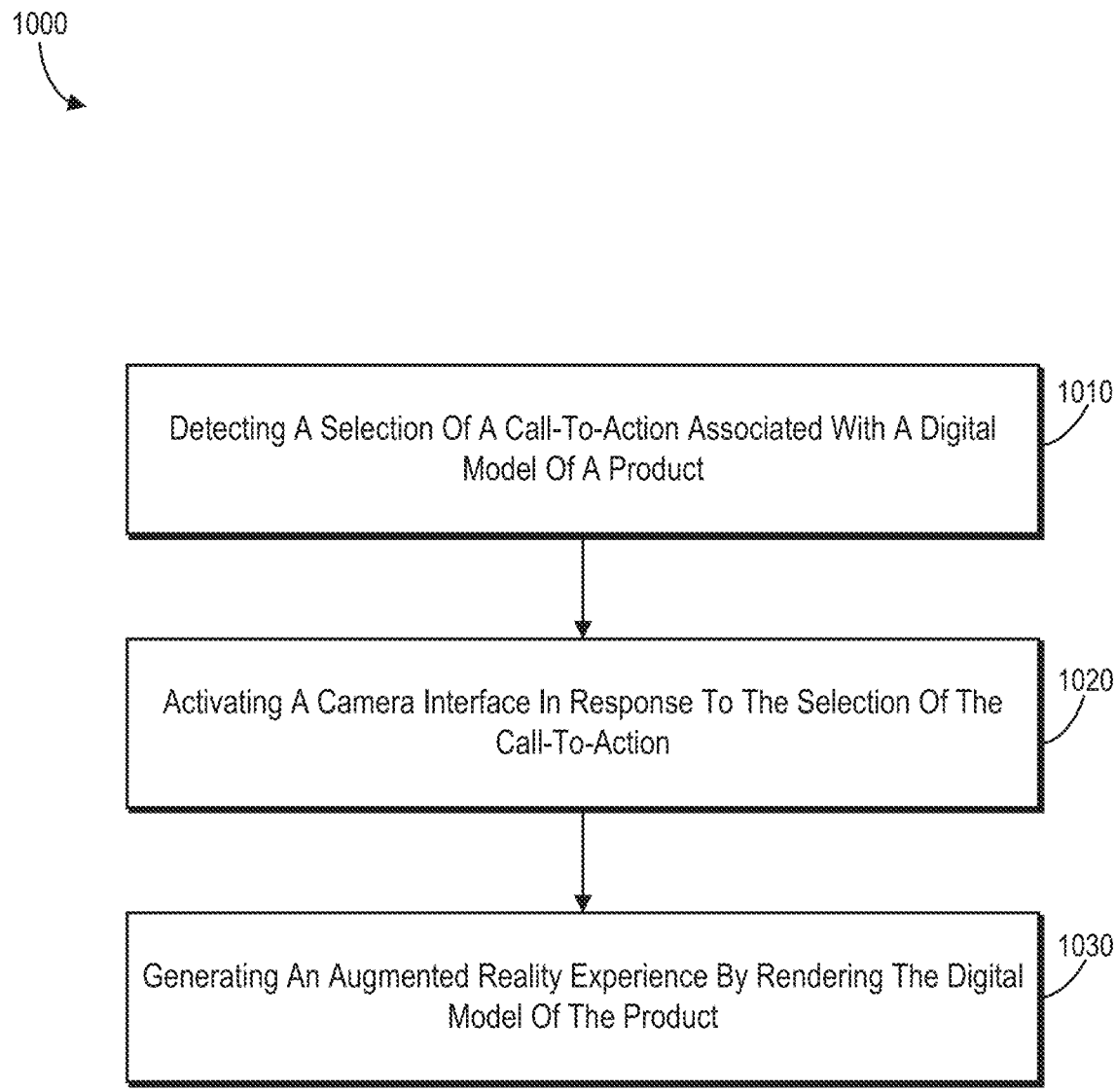
FIG. 10 illustrates a flowchart of a series of acts for providing an augmented reality presentation in accordance with one or more embodiments.
Figure 11:
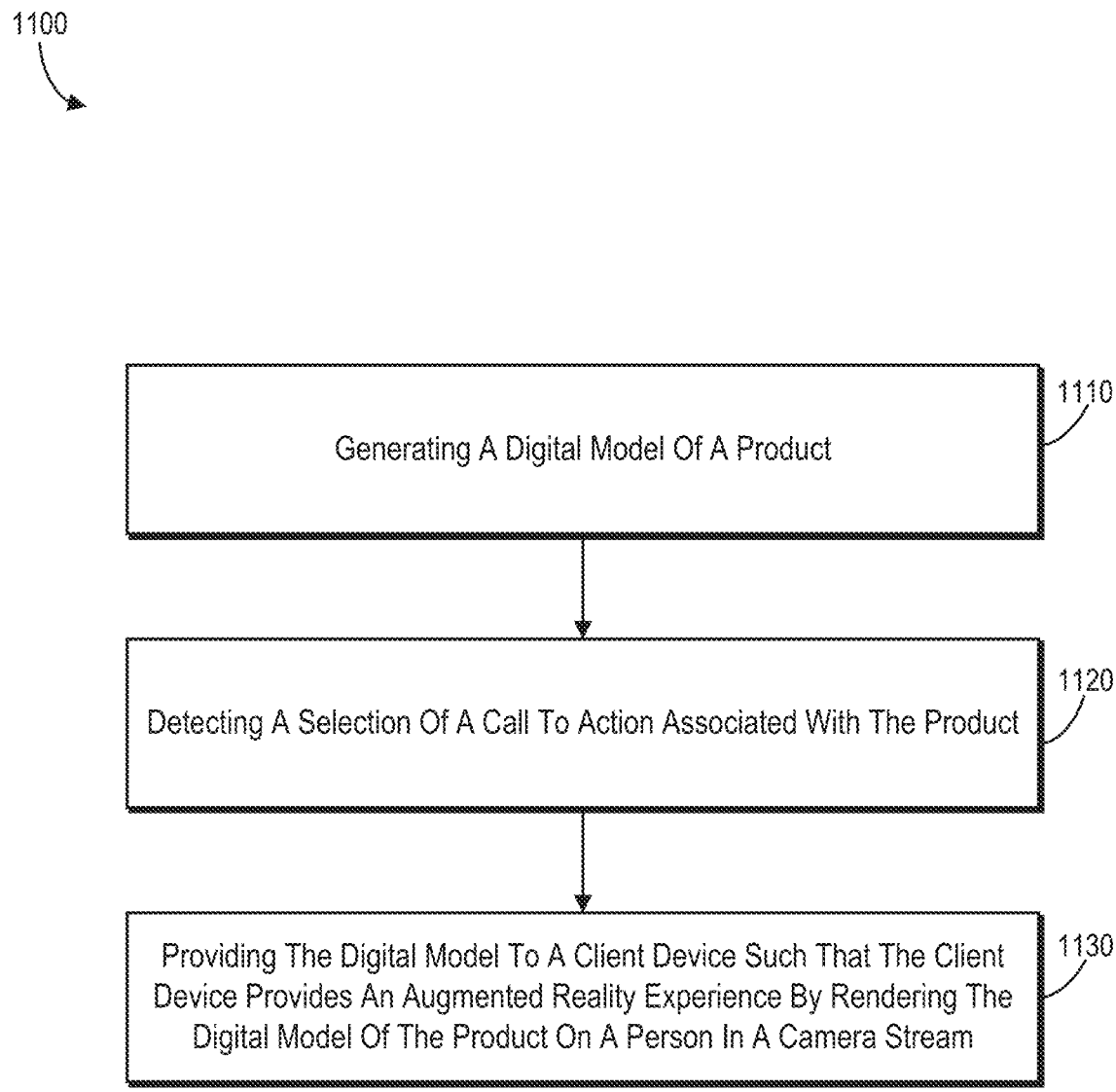
FIG. 11 illustrates another flowchart of a series of acts for providing an augmented reality presentation in accordance with one or more embodiments.

FIGS. 1-9, the corresponding text, and the examples, provide a number of different systems and devices that facilitate providing an augmented reality presentation including a digital model of a product in connection with a camera stream captured by a client device. Turning now to FIGS. 10-11 these figures represent flowcharts of series of acts for providing an augmented reality presentation in accordance with one or more embodiments described herein. While FIGS. 10-11 illustrate acts according to example embodiments, alternative embodiments may omit, add to, reorder, and/or modify any of the acts shown in FIGS. 10-11. The acts of FIGS. 10-11 can be performed as part of a method. Alternatively, a non-transitory computer readable medium can comprise instructions, that when executed by one or more processors, cause a computing device to perform the acts of FIGS. 10-11. In still further embodiments, a system can perform the acts of FIGS. 10-11.

FIG. 10 illustrates a flowchart of acts 1000 for providing an augmented reality presentation including a digital model of a product in accordance with one or more embodiments described herein. As shown in FIG. 10, the acts 1000 include an act 1010 of detecting a selection of a call-to-action (e.g., a selectable product link) associated with a digital model of a product including a digital model of the product. For example, in one or more embodiments, the act 1010 includes detecting a selection of a call-to-action associated with a digital model of a product where the digital model includes a digital model of the product and data for rendering the product within a graphical user interface (e.g., camera interface) of the client device 108. In one or more embodiments, the acts 1000 include, in response to detecting the selection of the call-to-action, providing, to a networking system 104, a request for the digital model of the product. In addition, the acts 1000 can include receiving, at a client device 108, the digital model of the product.

In addition, in one or more embodiments, the acts 1000 include providing the call-to-action over a portion of digital media associated with the product. For example, in one or more embodiments, the acts 1000 include analyzing the digital media to determine that the digital media is associated with the product. In addition, the acts 1000 can include providing the call-to-action associated with the digital model in connection with the digital media based on determining that the digital media is associated with the product (e.g., that the digital media includes a representation of the product and/or originates from a source associated with the product).

The acts 1000 can include providing the call-to-action in connection with the digital media over a variety of platforms. For example, in one or more embodiments, the acts 1000 include causing the client device 108 to provide the call-to-action via a third-party website associated with the product and detecting the selection of the call-to-action by detecting a selection of the call-to-action via the third-party website. In one or more embodiments, the acts 1000 include causing the client device 108 to provide the call-to-action via a live-video feed of a co-user of a networking system associated with the networking system application and in connection with a digital model of the product and detecting the selection of the call-to-action by detecting a selection of the call-to-action within the live-video feed of the co-user. In one or more embodiments, the acts 1000 include causing the client device 108 to provide the call-to-action via a user profile of a networking system 104 associated with the networking system application 110 and detecting the selection of the call-to-action via the user profile of the networking system 104.

As further shown in FIG. 10, the acts 1000 include an act 1020 of activating a camera interface of a networking system application 110 on a client device 108 by capturing and providing a camera stream within the camera interface of the networking system application 110. For example, in one or more embodiments, the act 1020 includes activating a camera interface of a networking system application 110 on the computing device where activating the camera interface includes capturing a camera stream and providing the camera stream within the camera interface of the networking system application 110.

As further shown, the acts 1000 include an act 1030 of generating an augmented reality experience by rendering the digital model of the product. For example, in one or more embodiments, the act 1030 includes generate an augmented reality experience by rendering, within the camera interface of the networking system application, the digital model of the product in connection with the camera stream. In one or more embodiments, the acts 1000 include detecting a face of a person within the camera stream and identifying one or more features of the face within the camera stream. Further, in one or more embodiments, rendering the digital model of the product can include placing the digital model of the product over a portion of the camera stream based on a location of the identified one or more features of the face within the camera stream.

In one or more embodiments, the acts 1000 include in response to detecting the selection of the call-to-action, providing, to a networking system 104, a request for the digital model of the product. The acts 1000 can further includes receiving, at the computing device, the digital model of the product.

In one or more embodiments, the acts 1000 include providing, within the camera interface, an effects menu including a selectable icon corresponding to the digital model of the product. The acts 1000 can further include detecting the selection of the call-to-action associated with the digital model of the product by detecting a selection of the selectable icon within the effects menu. In addition, in one or more embodiments, the acts 1000 include identifying a background effect associated with the digital model. The acts 1000 can further include providing, within the camera interface of the networking system application 110 and in response to identifying the background effect associated with the digital model, the background effect in connection with the rendered digital model of the product.

In one or more embodiments, the acts 1000 include detecting that the product is portrayed within digital media displayed on a graphical user interface of the computing device. The acts 1000 can further include determining that the digital model exists for the product portrayed within the digital media. Based on determining that the digital model exists for the product portrayed within the digital media, the acts 1000 can further include providing the call-to-action in connection with the displayed digital media.

In one or more embodiments, the acts 100 include, in response to detecting the selection of the call-to-action associated with the digital model of the product, receiving a plurality of digital models including the digital model of the product and an additional digital model corresponding to a related product to the product. In addition, the acts 1000 can include providing, within the camera interface, a selectable icon associated with viewing a digital model of the related product. Further, in one or more embodiments, the acts 1000 include detecting a selection of the selectable icon associated with viewing the digital model of the related product. In addition, the acts 1000 can include rendering, within the camera interface of the networking system application 110 and in connection with the digital model of the product, the digital model of the related product in connection with the camera stream.

Moreover, in one or more embodiments, the digital model includes a mesh model including vertices associated with (e.g., mapped to) corresponding reference features of an object (e.g., a face, user profile). In one or more embodiments, the acts 1000 include detecting the object within the camera stream and determining locations of reference features of the detected object within the camera stream. In addition, the acts 1000 can include rendering the digital model of the product at a location within the camera stream based on the determined locations of reference features of the detected object within the camera stream.

FIG. 11 illustrates a flowchart of acts 1100 for providing an augmented reality presentation including a digital model of a product in accordance with one or more embodiments described herein. As shown in FIG. 11, the acts 1100 include an act 1110 of generating a digital model of a product. For example, in one or more embodiments, the act 1110 includes generating, by at least one processor, a digital model of a product including depth and appearance data associated with the product.

In one or more embodiments, generating the digital model of the product includes generating a mesh model for the product including structural and depth information associated with the product. Generating the digital model can further include generating a UV map comprising surface appearance information associated with the product. Generating the digital model can further include combining the UV map and the mesh model to create the digital model of the product. In one or more embodiments, generating the digital model further includes mapping points of the mesh model to corresponding reference features of a detected face (or another detected object) within the camera stream captured by the client device.

As further shown, the acts 1100 include an act 1120 of detecting a selection of a call-to-action associated with the product. For example, in one or more embodiments, the act 1120 includes detecting a selection of a call-to-action associated with the digital model of the product. As further shown, the acts 1100 include an act 1130 of providing the digital model to a client device 108 such that the client device 108 provides an augmented reality experience by rendering the digital model of the product on a person in a camera stream. In one or more embodiments, the act 1130 includes in response to detecting the selection of the call-to-action, providing the digital model to a client device such that the client device provides an augmented reality experience by rendering the digital model of the product within a camera interface of a networking system application such that the digital model of the product appears over a camera stream captured by the client device. In one or more embodiments, providing the augmented reality experience includes rendering the digital model of the product at a location within the camera stream based on identified locations of reference features of a detected face (or other object) and corresponding mapping points of a mesh model for the product.

In one or more embodiments, the acts 1100 include receiving, at a server device(s) 102, the camera stream from the client device 108. The acts 1100 can further include generating, by the at least one processor, the augmented reality experience by rendering the digital model of the product within the camera stream. In one or more embodiments, providing the digital model to the client device includes providing the augmented reality experience to the client device 108. In one or more embodiments, the acts 1100 include broadcasting the augmented reality experience to one or more client devices of co-users of a networking system 104 associated with a user of the client device 108.

In one or more embodiments, the acts 1100 include receiving an enhanced video from the client device 108 including the camera stream and the rendered digital model of the product appearing over the camera stream. Further, in one or more embodiments, the acts 1100 include broadcasting the enhanced video to one or more client devices of one or more co-users of a networking system 104 associated with a user of the client device 108.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
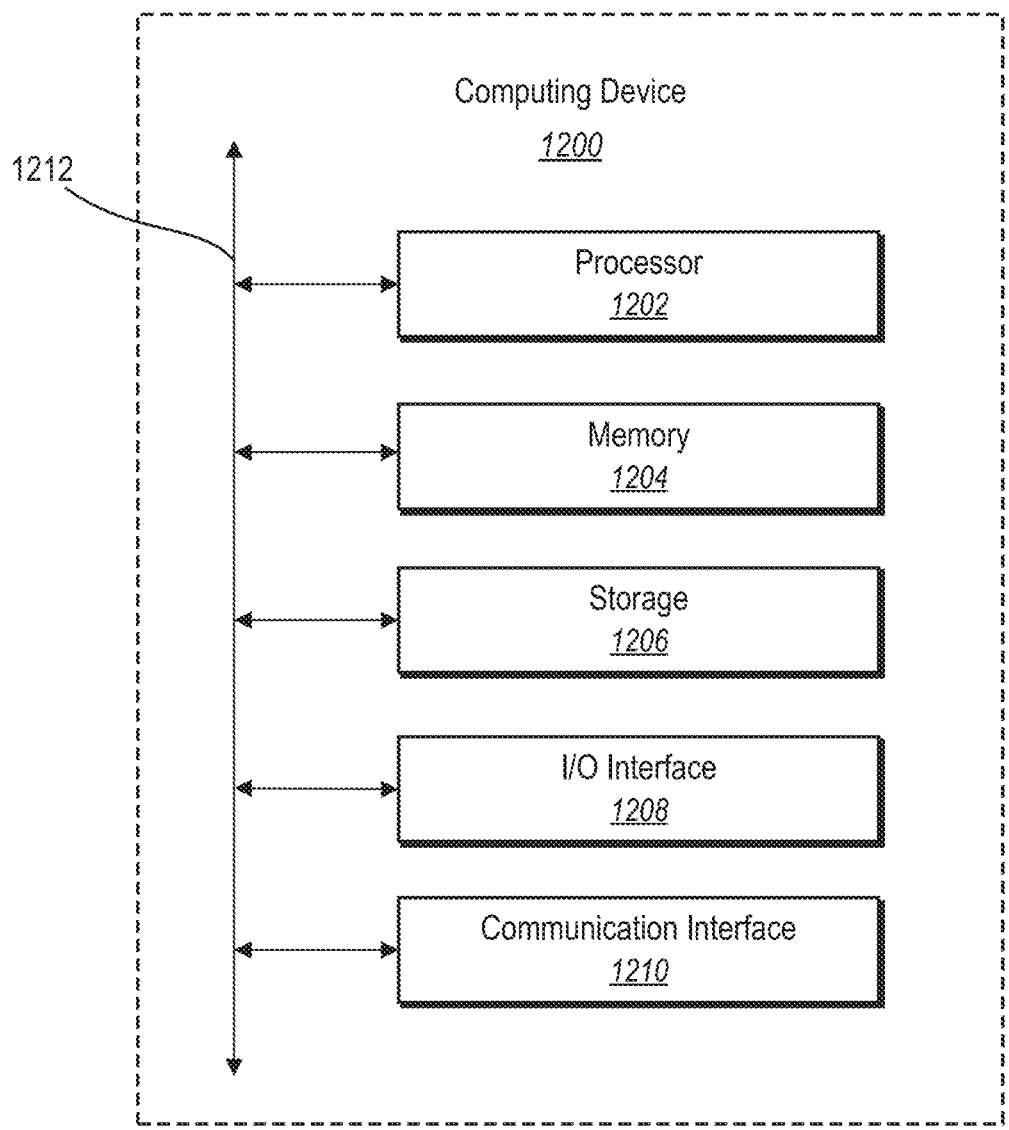
FIG. 12 illustrates a block diagram of an example computing device in accordance with one or more embodiments.

FIG. 12 illustrates, in block diagram form, an exemplary computing device 1200 that may be configured to perform one or more of the processes described above. In one or more embodiments, the server device(s) 102, client device 108, and merchant device 114 each comprise one or more computing devices in accordance with implementations of computing device 1200. As shown by FIG. 12, the computing device can comprise a processor 1202, a memory 1204, a storage device 1206, an I/O interface 1208, and a communication interface 1210, which may be communicatively coupled by way of communication infrastructure 1212. While an exemplary computing device 1200 is shown in FIG. 12, the components illustrated in FIG. 12 are not intended to be limiting. Additional or alternative components may be used in other embodiments. Furthermore, in certain embodiments, a computing device 1200 can include fewer components than those shown in FIG. 12. Components of computing device 1200 shown in FIG. 12 will now be described in additional detail.

In particular embodiments, processor 1202 includes hardware for executing instructions, such as those making up a computer program. As an example, and not by way of limitation, to execute instructions, processor 1202 may retrieve (or fetch) the instructions from an internal register, an internal cache, memory 1204, or storage device 1206 and decode and execute them. In particular embodiments, processor 1202 may include one or more internal caches for data, instructions, or addresses. As an example, and not by way of limitation, processor 1202 may include one or more instruction caches, one or more data caches, and one or more translation lookaside buffers (TLBs). Instructions in the instruction caches may be copies of instructions in memory 1204 or storage 1206.

Memory 1204 may be used for storing data, metadata, and programs for execution by the processor(s). Memory 1204 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. Memory 1204 may be internal or distributed memory.

Storage device 1206 includes storage for storing data or instructions. As an example, and not by way of limitation, storage device 1206 can comprise a non-transitory computer readable storage medium described above. Storage device 1206 may include a hard disk drive (HDD), a floppy disk drive, flash memory, an optical disc, a magneto-optical disc, magnetic tape, or a Universal Serial Bus (USB) drive or a combination of two or more of these. Storage device 1206 may include removable or non-removable (or fixed) media, where appropriate. Storage device 1206 may be internal or external to the computing device 1200. In particular embodiments, storage device 1206 is non-volatile, solid-state memory. In other embodiments, Storage device 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1208 allows a user to provide input to, receive output from, and otherwise transfer data to and receive data from computing device 1200. I/O interface 1208 may include a mouse, a keypad or a keyboard, a touch screen, a camera, an optical scanner, network interface, modem, other known I/O devices or a combination of such I/O interfaces. I/O interface 1208 may include one or more devices for presenting output to a user, including, but not limited to, a graphics engine, a display (e.g., a display screen), one or more output driver's (e.g., display driver's), one or more audio speakers, and one or more audio driver's. In certain embodiments, I/O interface 1208 is configured to provide graphical data to a display for presentation to a user. The graphical data may be representative of one or more graphical user interfaces and/or any other graphical content as may serve a particular implementation.

Communication interface 1210 can include hardware, software, or both. In any event, communication interface 1210 can provide one or more interfaces for communication (such as, for example, packet-based communication) between computing device 1200 and one or more other computing devices or networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, communication interface 1210 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1210 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 1212 may include hardware, software, or both that couples components of computing device 1200 to each other. As an example and not by way of limitation, communication infrastructure 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, in one or more embodiments, the networking system 104 is linked to and/or is implemented as a social networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third-party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example, and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in to a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (e.g., timeline)" or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similar to events, the calendar entries may include times, dates, locations and identities of other users.

Figure 13:
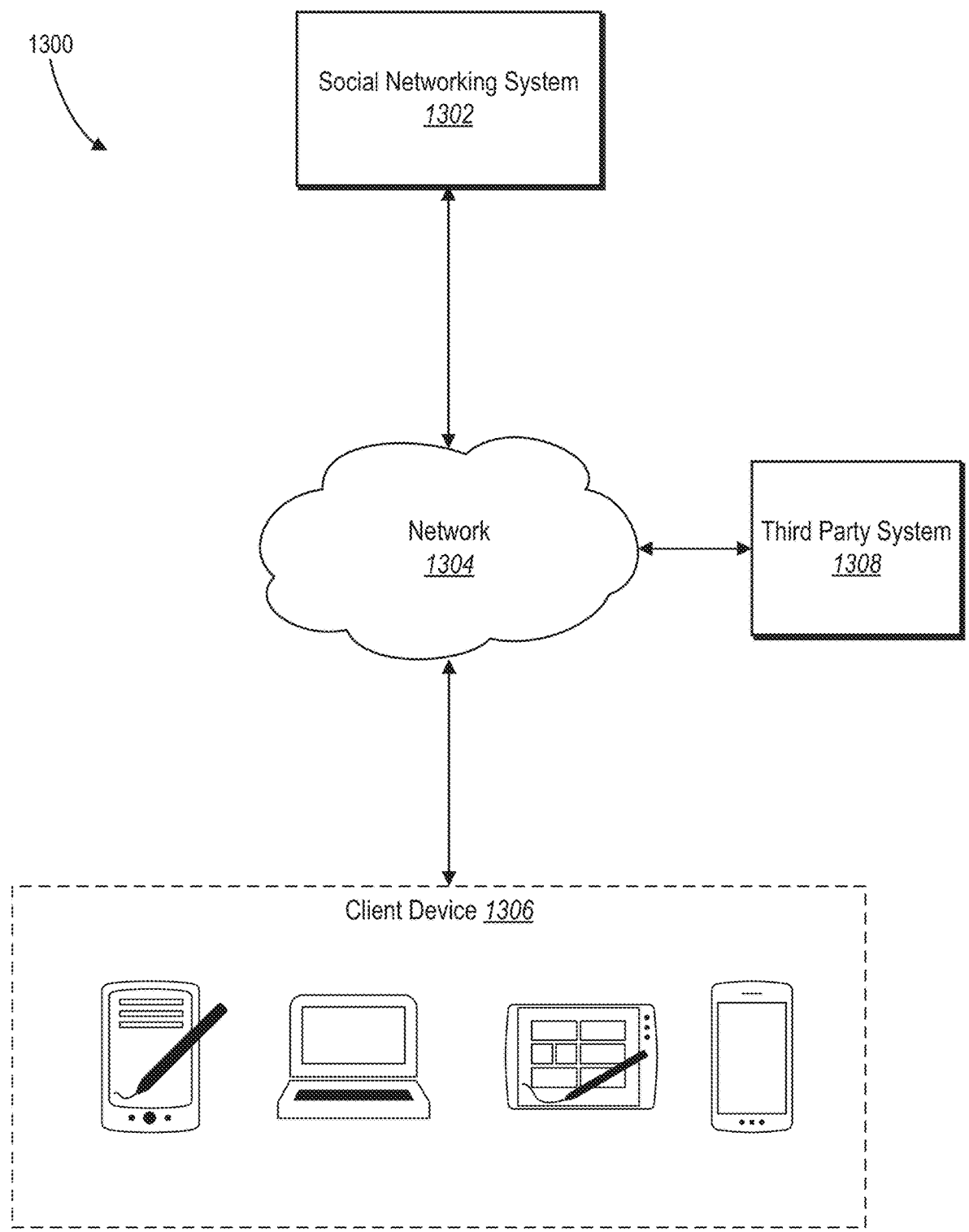
FIG. 13 illustrates a block diagram of an example network environment of a social networking system in accordance with one or more embodiments.

FIG. 13 illustrates an example network environment 1300 of a social-networking system. In particular embodiments, a social-networking system 1302 may comprise one or more data stores. In particular embodiments, the social-networking system 1302 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 1302 may comprise one or more computing devices (e.g., servers) hosting functionality directed to operation of the social-networking system 1302. A user of the social-networking system 1302 may access the social-networking system 1302 using a client device such as client device 1306. In particular embodiments, the client device 1306 can interact with the social-networking system 1302 through a network 1304.

The client device 1306 may be a desktop computer, a laptop computer, a tablet computer, a personal digital assistant (PDA), an in- or out-of-car navigation system, a smart phone or other cellular or mobile phone, or a mobile gaming device, other mobile device, or other suitable computing devices. Client device 1306 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 1304.

Network 1304 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1306 may access the social-networking system 1302.

While these methods, systems, and user interfaces utilize both publicly available information as well as information provided by users of the social-networking system, all use of such information is to be explicitly subject to all privacy settings of the involved users and the privacy policy of the social-networking system as a whole.

Figure 14:
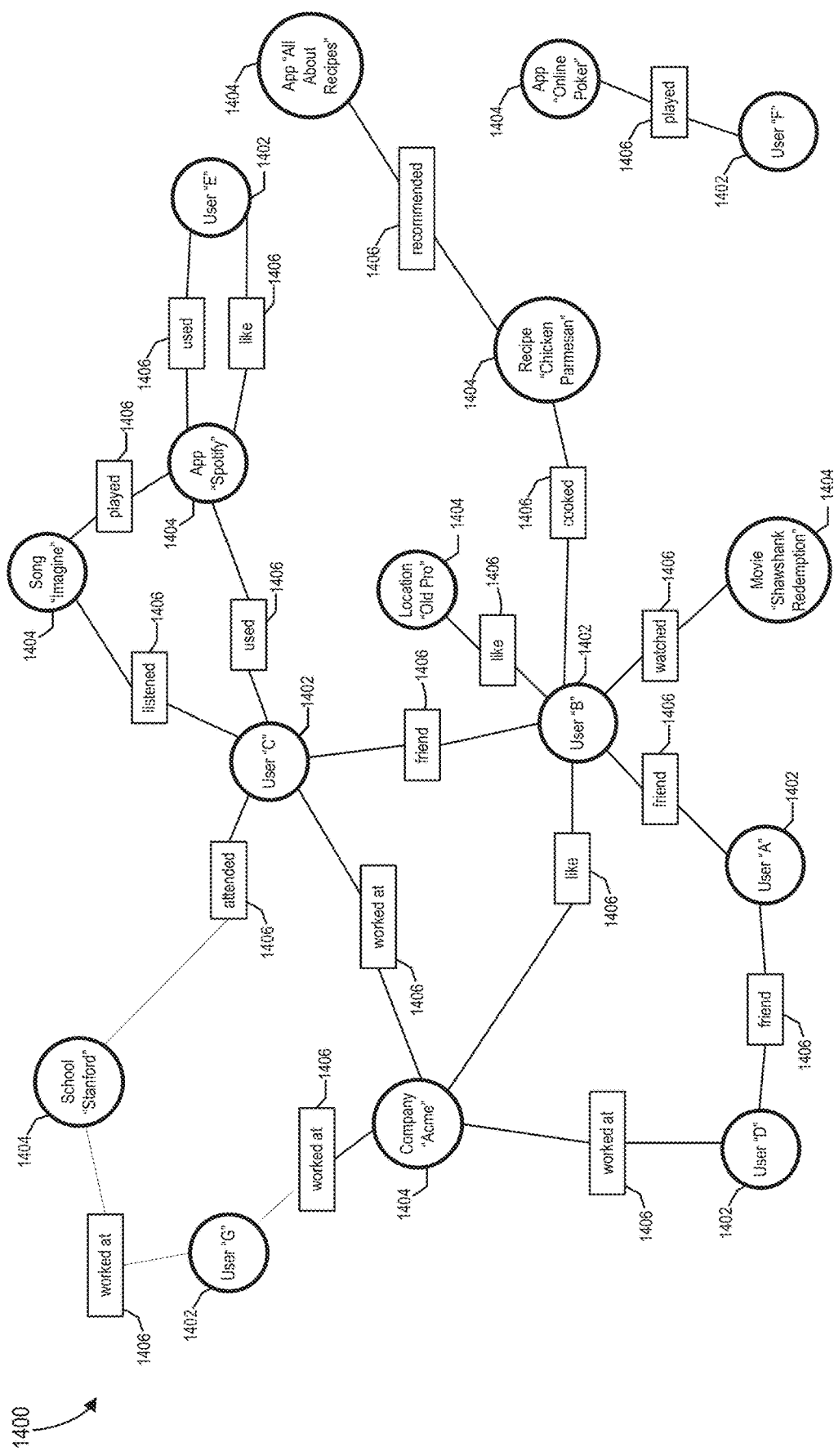
FIG. 14 illustrates a social graph in accordance with one or more embodiments.

FIG. 14 illustrates example social graph 1400. In particular embodiments, social networking system 1302 may store one or more social graphs 1400 in one or more data stores. In particular embodiments, social graph 1400 may include multiple nodes—which may include multiple user nodes 1402 or multiple concept nodes 1404—and multiple edges 1406 connecting the nodes. Example social graph 1400 illustrated in FIG. 14 is shown, for didactic purposes, in a two-dimensional visual map representation. In particular embodiments, a social networking system 1302, client device 1306, or third-party system 1308 may access social graph 1400 and related social-graph information for suitable applications. The nodes and edges of social graph 1400 may be stored as data objects, for example, in a data store (such as a social-graph database). Such a data store may include one or more searchable or query able indexes of nodes or edges of social graph 1400.

In particular embodiments, a user node 1402 may correspond to a user of social networking system 1302. As an example, and not by way of limitation, a user may be an individual (human user), an entity (e.g., an enterprise, business, or third-party application), or a group (e.g., of individuals or entities) that interacts or communicates with or over social networking system 1302. In particular embodiments, when a user registers for an account with social networking system 1302, social networking system 1302 may create a user node 1402 corresponding to the user, and store the user node 1402 in one or more data stores. Users and user nodes 1402 described herein may, where appropriate, refer to registered users and user nodes 1402 associated with registered users. In addition, or as an alternative, users and user nodes 1402 described herein may, where appropriate, refer to users that have not registered with social networking system 1302. In particular embodiments, a user node 1402 may be associated with information provided by a user or information gathered by various systems, including social networking system 1302. As an example, and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1404 may correspond to a concept. As an example and not by way of limitation, a concept may correspond to a place (such as, for example, a movie theater, restaurant, landmark, or city); a website (such as, for example, a website associated with social-network system 1302 or a third-party website associated with a web-application server); an entity (such as, for example, a person, business, group, sports team, or celebrity); a resource (such as, for example, an audio file, video file, digital photo, text file, structured document, or application) which may be located within social networking system 1302 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1404 may be associated with information of a concept provided by a user or information gathered by various systems, including social networking system 1302. As an example, and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1404 may be associated with one or more data objects corresponding to information associated with concept node 1404. In particular embodiments, a concept node 1404 may correspond to one or more webpages.

In particular embodiments, a node in social graph 1400 may represent or be represented by a webpage (which may be referred to as a "profile page"). Profile pages may be hosted by or accessible to social networking system 1302. Profile pages may also be hosted on third-party websites associated with a third-party system 1308. As an example, and not by way of limitation, a profile page corresponding to a particular external webpage may be the particular external webpage and the profile page may correspond to a particular concept node 1404. Profile pages may be viewable by all or a selected subset of other users. As an example, and not by way of limitation, a user node 1402 may have a corresponding user-profile page in which the corresponding user may add content, make declarations, or otherwise express himself or herself. As another example and not by way of limitation, a concept node 1404 may have a corresponding concept-profile page in which one or more users may add content, make declarations, or express themselves, particularly in relation to the concept corresponding to concept node 1404.

In particular embodiments, a concept node 1404 may represent a third-party webpage or resource hosted by a third-party system 1308. The third-party webpage or resource may include, among other elements, content, a selectable or other icon, or other inter-actable object (which may be implemented, for example, in JavaScript, AJAX, or PHP codes) representing an action or activity. As an example, and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 1306 to send to social networking system 1302 a message indicating the user's action. In response to the message, social networking system 1302 may create an edge (e.g., an "eat" edge) between a user node 1402 corresponding to the user and a concept node 1404 corresponding to the third-party webpage or resource and store edge 1406 in one or more data stores.

In particular embodiments, a pair of nodes in social graph 1400 may be connected to each other by one or more edges 1406. An edge 1406 connecting a pair of nodes may represent a relationship between the pair of nodes. In particular embodiments, an edge 1406 may include or represent one or more data objects or attributes corresponding to the relationship between a pair of nodes. As an example, and not by way of limitation, a first user may indicate that a second user is a "friend" of the first user. In response to this indication, social networking system 1302 may send a "friend request" to the second user. If the second user confirms the "friend request," social networking system 1302 may create an edge 1406 connecting the first user's user node 1402 to the second user's user node 1402 in social graph 1400 and store edge 1406 as social-graph information in one or more of data stores. In the example of FIG. 14, social graph 1400 includes an edge 1406 indicating a friend relation between user nodes 1402 of user "A" and user "B" and an edge indicating a friend relation between user nodes 1402 of user "C" and user "B." Although this disclosure describes or illustrates particular edges 1406 with particular attributes connecting particular user nodes 1402, this disclosure contemplates any suitable edges 1406 with any suitable attributes connecting user nodes 1402. As an example, and not by way of limitation, an edge 1406 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1400 by one or more edges 1406.

In particular embodiments, an edge 1406 between a user node 1402 and a concept node 1404 may represent a particular action or activity performed by a user associated with user node 1402 toward a concept associated with a concept node 1404. As an example and not by way of limitation, as illustrated in FIG. 14, a user may "like,"

"attended," "played," "listened," "cooked," "worked at," or "watched" a concept, each of which may correspond to an edge type or subtype. A concept-profile page corresponding to a concept node 1404 may include, for example, a selectable "check in" icon (such as, for example, a clickable "check in" icon) or a selectable "add to favorites" icon. Similarly, after a user clicks these icons, social networking system 1302 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 1302 may create a "listened" edge 1406 and a "used" edge (as illustrated in FIG. 14) between user nodes 1402 corresponding to the user and concept nodes 1404 corresponding to the song and application to indicate that the user listened to the song and used the application. Moreover, social networking system 1302 may create a "played" edge 1406 (as illustrated in FIG. 14) between concept nodes 1404 corresponding to the song and the application to indicate that the particular song was played by the particular application. In this case, "played" edge 1406 corresponds to an action performed by an external application (SPOTIFY) on an external audio file (the song "Imagine"). Although this disclosure describes particular edges 1406 with particular attributes connecting user nodes 1402 and concept nodes 1404, this disclosure contemplates any suitable edges 1406 with any suitable attributes connecting user nodes 1402 and concept nodes 1404. Moreover, although this disclosure describes edges between a user node 1402 and a concept node 1404 representing a single relationship, this disclosure contemplates edges between a user node 1402 and a concept node 1404 representing one or more relationships. As an example, and not by way of limitation, an edge 1406 may represent both that a user likes and has used at a particular concept. Alternatively, another edge 1406 may represent each type of relationship (or multiples of a single relationship) between a user node 1402 and a concept node 1404 (as illustrated in FIG. 14 between user node 1402 for user "E" and concept node 1404 for "SPOTIFY").

In particular embodiments, social networking system 1302 may create an edge 1406 between a user node 1402 and a concept node 1404 in social graph 1400. As an example and not by way of limitation, a user viewing a concept-profile page (such as, for example, by using a web browser or a special-purpose application hosted by the user's client device 1306) may indicate that he or she likes the concept represented by the concept node 1404 by clicking or selecting a "Like" icon, which may cause the user's client device 1306 to send to social networking system 1302 a message indicating the user's liking of the concept associated with the concept-profile page. In response to the message, social networking system 1302 may create an edge 1406 between user node 1402 associated with the user and concept node 1404, as illustrated by "like" edge 1406 between the user and concept node 1404. In particular embodiments, social networking system 1302 may store an edge 1406 in one or more data stores. In particular embodiments, an edge 1406 may be automatically formed by social networking system 1302 in response to a particular user action. As an example, and not by way of limitation, if a first user uploads a picture, watches a movie, or listens to a song, an edge 1406 may be formed between user node 1402 corresponding to the first user and concept nodes 1404 corresponding to those concepts. Although this disclosure describes forming particular edges 1406 in particular manners, this disclosure contemplates forming any suitable edges 1406 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on social networking system 1302). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example, and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 1302 may execute or modify a particular action of the user.

An advertisement may also include social-networking-system functionality that a user may interact with. As an example, and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 1302) or RSVP (e.g., through social networking system 1302) to an event associated with the advertisement. In addition, or as an alternative, an advertisement may include social-networking-system context directed to the user. As an example, and not by way of limitation, an advertisement may display information about a friend of the user within social networking system 1302 who has taken an action associated with the subject matter of the advertisement.

In particular embodiments, social networking system 1302 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 1302 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 1302 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example, and not by way of limitation, particular user actions may be assigned both a rating and a weight while a relationship associated with the particular user action is assigned a rating and a correlating weight (e.g., so the weights total 250%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 1302 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example, and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 1302 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 1302 may calculate a coefficient based on a user's actions. Social networking system 1302 may monitor such actions on the online social network, on a third-party system 1308, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 1302 may calculate a coefficient based on the user's actions with particular types of content. The content may be associated with the online social network, a third-party system 1308, or another suitable system. The content may include users, profile pages, posts, news stories, headlines, instant messages, chat room conversations, emails, advertisements, pictures, video, music, other suitable objects, or any combination thereof. Social networking system 1302 may analyze a user's actions to determine whether one or more of the actions indicate an affinity for subject matter, content, other users, and so forth. As an example, and not by way of limitation, if a user may make frequently posts content related to "coffee" or variants thereof, social networking system 1302 may determine the user has a high coefficient with respect to the concept "coffee." Particular actions or types of actions may be assigned a higher weight and/or rating than other actions, which may affect the overall calculated coefficient. As an example, and not by way of limitation, if a first user emails a second user, the weight or the rating for the action may be higher than if the first user simply views the user-profile page for the second user.

In particular embodiments, social networking system 1302 may calculate a coefficient based on the type of relationship between particular objects. Referencing the social graph 1400, social networking system 1302 may analyze the number and/or type of edges 1406 connecting particular user nodes 1402 and concept nodes 1404 when calculating a coefficient. As an example, and not by way of limitation, user nodes 1402 that are connected by a spouse-type edge (representing that the two users are married) may be assigned a higher coefficient than a user nodes 1402 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example, and not by way of limitation, if a user is tagged in first photo, but merely likes a second photo, social networking system 1302 may determine that the user has a higher coefficient with respect to the first photo than the second photo because having a tagged-in-type relationship with content may be assigned a higher weight and/or rating than having a like-type relationship with content. In particular embodiments, social networking system 1302 may calculate a coefficient for a first user based on the relationship one or more second users have with a particular object. In other words, the connections and coefficients other users have with an object may affect the first user's coefficient for the object. As an example, and not by way of limitation, if a first user is connected to or has a high coefficient for one or more second users, and those second users are connected to or have a high coefficient for a particular object, social networking system 1302 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1400. As an example, and not by way of limitation, social-graph entities that are closer in the social graph 1400 (i.e., fewer degrees of separation) may have a higher coefficient than entities that are further apart in the social graph 1400.

In particular embodiments, social networking system 1302 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 1306 of the user). A first user may be more interested in other users or concepts that are closer to the first user. As an example, and not by way of limitation, if a user is one mile from an airport and two miles from a gas station, social networking system 1302 may determine that the user has a higher coefficient for the airport than the gas station based on the proximity of the airport to the user.

In particular embodiments, social networking system 1302 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 1302 may provide information that is relevant to user's interests and current circumstances, increasing the likelihood that they will find such information of interest. In particular embodiments, social networking system 1302 may generate content based on coefficient information. Content objects may be provided or selected based on coefficients specific to a user. As an example, and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 1302 may generate search results based on coefficient information. Search results for a particular user may be scored or ranked based on the coefficient associated with the search results with respect to the querying user. As an example, and not by way of limitation, search results corresponding to objects with higher coefficients may be ranked higher on a search-results page than results corresponding to objects having lower coefficients.

In particular embodiments, social networking system 1302 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1308 (e.g., via an API or other communication channel), or from another suitable system. In response to the request, social networking system 1302 may calculate the coefficient (or access the coefficient information if it has previously been calculated and stored). In particular embodiments, social networking system 1302 may measure an affinity with respect to a particular process. Different processes (both internal and external to the online social network) may request a coefficient for a particular object or set of objects. Social networking system 1302 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 8, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, field Oct. 1, 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example, and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example, and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example, and not by way of limitation, a particular concept node 1404 corresponding to a particular photo may have a privacy setting specifying that the photo may only be accessed by users tagged in the photo and their friends. In particular embodiments, privacy settings may allow users to opt in or opt out of having their actions logged by social networking system 1302 or shared with other systems (e.g., third-party system 1308). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 1302 may send a request to the data store for the object. The request may identify the user associated with the request and may only be sent to the user (or a client device 1306 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A non-transitory computer-readable medium storing instructions thereon that, when executed by at least one processor, cause a computing device to:

provide, for display by a networking system application on the computing device, a digital media feed comprising one or more posts shared by users of a social networking system associated with the networking system application;

provide, within the digital media feed displayed by the networking system application, digital media portraying a product, wherein the digital media comprises a first call-to-action associated with the product;

detect, via the networking system application, a selection of the first call-to-action associated with the product portrayed in the digital media; and in response to detecting the selection of the first call-to-action:

retrieve a digital model of the product portrayed in the digital media;

activate a camera interface of the networking system application on the computing device, wherein activating the camera interface comprises capturing a camera stream and providing the camera stream within the camera interface on the computing device;

generate an augmented reality experience by rendering, within the camera interface of the networking system application on the computing device, the digital model of the product portrayed in the digital media in connection with the camera stream; and provide, within the camera interface, a second call-to-action configured to cause the computing device to locally store the digital model of the product portrayed in the digital media on the computing device for access to the augmented reality experience while offline.

2. The non-transitory computer-readable medium of claim 1, wherein the instructions, when executed by the at least one processor, cause the computing device to generate the augmented reality experience by:

detecting a face of a person within the camera stream;

identifying one or more features of the face within the camera stream; and rendering the digital model of the product portrayed in the digital media in connection with the camera stream by placing the digital model of the product over a portion of the camera stream based on a location of the identified one or more features of the face within the camera stream.

3. The non-transitory computer-readable medium of claim 1, wherein the instructions, when executed by the at least one processor, cause the computing device to retrieve the digital model of the product portrayed in the digital media by:

providing, to a networking system, a request for the digital model of the product portrayed in the digital media; and receiving, at the computing device, the digital model of the product portrayed in the digital media.

4. The non-transitory computer-readable medium of claim 1, further comprising instructions that, when executed by the at least one processor, cause the computing device to:

provide, within the camera interface of the networking system application, an effects menu comprising a selectable icon corresponding to an additional digital model of an additional product;

detect, via the networking system application, a selection of the selectable icon within the effects menu; and in response to detecting the selection of the selectable icon within the effects menu, render, within the camera interface of the networking system application on the computing device, the additional digital model of the additional product in connection with the camera stream.

5. The non-transitory computer-readable medium of claim 1, wherein the instructions, when executed by the at least one processor, cause the computing device to provide the digital media comprising the first call-to-action via a live-video feed of a co-user of the social networking system associated with the networking system application and in connection with the digital model of the product.

6. The non-transitory computer-readable medium of claim 1, further comprising instructions that, when executed by the at least one processor, cause the computing device to:

identify a background effect associated with the digital model of the product; and provide, within the camera interface of the networking system application on the computing device and in response to identifying the background effect associated with the digital model of the product, the background effect in connection with rendering the digital model of the product within the camera interface of the networking system application.

7. The non-transitory computer-readable medium of claim 1, further comprising instructions that, when executed by the at least one processor, cause the computing device to:

in response to detecting the selection of the first call-to-action, receive an additional digital model corresponding to a related product to the product; and provide, within the camera interface of the networking system application, a selectable icon associated with viewing the additional digital model corresponding to the related product.

8. The non-transitory computer-readable medium of claim 1, further comprising instructions that, when executed by the at least one processor, cause the computing device to:

receive a selection of the second call-to-action; and store, locally on the computing device, the digital model of the product portrayed in the digital media in response to receiving the selection of the second call-to-action.

9. The non-transitory computer-readable medium of claim 8, further comprising instructions that, when executed by the at least one processor, cause the computing device to:

provide, via a graphical user interface displayed on the computing device while the computing device is offline, a selectable icon corresponding to the digital model of the product portrayed in the digital media;

detect a selection of the selectable icon corresponding to the digital model; and in response to detecting the selection of the selectable icon, provide an offline augmented reality experience for display on the computing device.

10. The non-transitory computer-readable medium of claim 1, wherein the one or more posts shared by the users of the social networking system associated with the networking system application comprises at least one of a video, a message, or an advertisement.

11. A method comprising:

generating, by at least one processor, a digital model of a product;

providing, for display by a networking system application on a client device, a digital media feed comprising one or more posts shared by users of a social networking system associated with the networking system application;

providing, within the digital media feed displayed by the networking system application, digital media portraying the product, wherein the digital media comprises a first call-to-action associated with the product;

detecting, via the networking system application, a selection of the first call-to-action associated with the product portrayed in the digital media; and in response to detecting the selection of the first call-to-action:

retrieving the digital model of the product portrayed in the digital media;

providing the digital model of the product to the client device such that the client device provides an augmented reality experience by rendering the digital model of the product within a camera interface of the networking system application activated on the client device such that the digital model of the product appears over a camera stream captured by the client device; and providing, within the camera interface, a second call-to-action configured to cause the client device to locally store the digital model of the product portrayed in the digital media on the client device for access to the augmented reality experience while offline.

12. The method of claim 11, wherein generating the digital model of the product comprises:

generating a mesh model for the product comprising structural and depth information associated with the product;

generating a UV map comprising surface appearance information associated with the product; and combining the UV map and the mesh model to create the digital model of the product.

13. The method of claim 12, wherein generating the digital model of the product further comprises mapping points of the mesh model to corresponding reference features of a detected face within the camera stream captured by the client device.

14. The method of claim 13, wherein providing the augmented reality experience comprises rendering the digital model of the product at a location within the camera stream based on identified locations of the corresponding reference features of the detected face and corresponding mapping points of the mesh model for the product.

15. The method of claim 11, further comprising:

receiving, at a server device, the camera stream from the networking system application on the client device;

generating, by the at least one processor, the augmented reality experience by rendering the digital model of the product within the camera stream; and wherein providing the digital model to the client device comprises providing the augmented reality experience to the networking system application on the client device.

16. The method of claim 15, further comprising:

broadcasting the augmented reality experience to one or more client devices of co-users of the social networking system associated with a user of the client device.

17. The method of claim 11, further comprising:

receiving an enhanced video from the client device comprising the camera stream and the digital model of the product appearing over the camera stream; and broadcasting the enhanced video to one or more client devices of one or more co-users of the social networking system associated with a user of the client device.

18. A system comprising:

at least one processor;

at least one non-transitory computer readable storage medium storing instructions that, when executed by the at least one processor, cause the system to:

provide, for display by a networking system application on a computing device, a digital media feed comprising one or more posts shared by users of a social networking system associated with the networking system application;

provide, within the digital media feed displayed by the networking system application, digital media portraying a product, wherein the digital media comprises a first call-to-action associated with the product;

detect, via the networking system application, a selection of the first call-to-action associated with the product portrayed in the digital media; and in response to detecting the selection of the first call-to-action:

retrieve a digital model of the product portrayed in the digital media;

activate a camera interface of the networking system application on the computing device, wherein activating the camera interface comprises capturing a camera stream and providing the camera stream within the camera interface on the computing device;

generate an augmented reality experience by rendering, within the camera interface of the networking system application on the computing device, the digital model of the product portrayed in the digital media in connection with the camera stream; and provide, within the camera interface, a second call-to-action configured to cause the computing device to locally store the digital model of the product portrayed in the digital media on the computing device for access to the augmented reality experience while offline.

19. The system of claim 18, wherein the instructions, when executed by the at least one processor, cause the system to generate the augmented reality experience by:

detecting a face of a person within the camera stream;

identifying one or more features of the face within the camera stream; and rendering the digital model of the product portrayed in the digital media in connection with the camera stream by placing the digital model of the product over a portion of the camera stream based on a location of the identified one or more features of the face within the camera stream.

20. The system of claim 18, wherein:

the digital model comprises a mesh model comprising vertices associated with corresponding reference features of an object, and the instructions, when executed by the at least one processor, cause the system to generate the augmented reality experience by:

detecting the object within the camera stream;

determining locations of reference features of the detected object within the camera stream; and rendering the digital model of the product at a location within the camera stream based on the determined locations of reference features of the detected object within the camera stream.

* * * * *